US012701346B2

(12) United States Patent
Hand et al.

(10) Patent No.: US 12,701,346 B2
(45) Date of Patent: Aug. 4, 2026

(54) SEPARATELY MANAGED NETWORK ENTITY WITH VIRTUALIZED TRANSPORT FUNCTION

(71) Applicant: Infinera Corporation, San Jose, CA (US)

(72) Inventors: Steven Joseph Hand, Los Gatos, CA (US); Vasudha Bhaskara, Milpitas, CA (US); Mika Silvola, Kempele (FI); Dirk Corsus, Saratoga, CA (US); Mats Plantare, Stockholm (SE); Per Lembre, Stockholm (SE); David F. Welch, Atheerton, CA (US)

(73) Assignee: Infinera Corporation

( * ) Notice: Subject to any disclaimer, the term of this patent is extended or adjusted under 35 U.S.C. 154(b) by 1015 days.

(21) Appl. No.: 17/895,846

(22) Filed: Aug. 25, 2022

(65) Prior Publication Data

US 2023/0066541 A1      Mar. 2, 2023

Related U.S. Application Data

(60) Provisional application No. 63/236,717, filed on Aug. 25, 2021.

(51) Int. Cl.
| | |
|---|---|
| *H04J 14/00* | (2006.01) |
| *H04B 10/40* | (2013.01) |
| *H04J 14/02* | (2006.01) |
| *H04Q 11/00* | (2006.01) |

(52) U.S. Cl.
CPC ......... *H04Q 11/0067* (2013.01); *H04B 10/40* (2013.01); *H04J 14/0282* (2013.01)

(58) Field of Classification Search
CPC .... H04B 10/27; H04B 10/40; H04B 10/0795; H04B 10/0793; H04Q 11/0067; H04Q 11/0066; H04J 14/02; H04J 14/0228; H04J 14/0282; H04J 14/0245; H04J 14/0267
USPC ........ 398/66, 67, 68, 69, 70, 71, 72, 98, 99, 398/100, 79, 45, 48, 49, 33, 38, 135, 136, 398/25, 26, 27; 370/352, 392, 389, 468, 370/465
See application file for complete search history.

(56) References Cited

U.S. PATENT DOCUMENTS

| | | | | | |
|---|---|---|---|---|---|
| 7,676,154 | B2 * | 3/2010 | Vukovic | ............. | H04J 14/0283 |
| | | | | | 398/58 |
| 8,811,820 | B2 * | 8/2014 | Dahlfort | ............ | H04L 41/5058 |
| | | | | | 398/100 |
| 10,644,802 | B1 * | 5/2020 | Soto | ................... | H04Q 11/0067 |
| 2012/0275784 | A1 * | 11/2012 | Soto | ................... | H04B 10/2589 |
| | | | | | 398/67 |

* cited by examiner

*Primary Examiner* — Hanh Phan
(74) *Attorney, Agent, or Firm* — Nokia Technologies Oy

(57) ABSTRACT

Implementations for remotely managing an optical transceiver connected to a network device and optical network is described. A user can use a network device controller and optical transceiver controller in a remote server to communicate with the service agent in the network device and the optical transceiver to configure communications with the optical network through the optical transceiver. The service agent and its controller in the server can perform virtualized transport functions and the network device controller and the network device can, in some instances, implement layer 2/3 demarc.

17 Claims, 10 Drawing Sheets

FIG. 2

SEPARATELY MANAGED NETWORK ENTITY WITH VIRTUALIZED TRANSPORT FUNCTION

CROSS-REFERENCE TO RELATED APPLICATION

This application claims the benefit of U.S. Provisional Application No. 63/236,717, filed Aug. 25, 2021, which is incorporated herein by reference in its entirety.

FIELD OF THE DISCLOSURE

This specification generally relates to optical communication systems and methods for performing remote management of pluggable network devices.

BACKGROUND

Optical networks can be used to communicate data using light signals. Such networks can utilize pluggable modules that perform certain functions. However, configuring and managing such pluggable devices (e.g., upgrading software, topology awareness, power balancing) can sometimes be problematic for users because the user or a technician may have to be present on site to perform the configuring or managing.

SUMMARY

This disclosure describes systems, methods, devices, and other implementations for enabling an optical device to be managed remotely and independently from the host device it is plugged or embedded into.

To facilitate the independent and remote management of a pluggable optical device such as an optical transceiver, a service agent can be implemented in a host optical network device into which the pluggable optical device is plugged into or embedded. The service agent can help conduct various operations such as discovery and configuration of the pluggable optical device to facilitate communications with the pluggable optical device and enable a user to remotely communicate and control the pluggable optical device. The host optical network device can also provide services, such as access to storage devices, or sharing of resources, such as processors or clocks, to facilitate the operations of the pluggable optical device.

According to some implementations, a system includes an optical transceiver and an optical network device. The optical transceiver is coupled to the optical network device and is configured to connect the optical network device to an optical network that comprises two or more network nodes. The optical network device includes a service agent and a server. The service agent is configured to communicate with the optical transceiver. The server configures the optical transceiver for remote management through the server. The remote management is performed at a location different from a location of the optical transceiver and different from a location of the optical network device. The server is configured to communicate with the optical transceiver through the optical network device to perform virtualized transport functions.

In some implementations, the service agent is configured to discover a connection of the optical transceiver with the optical network device through a pluggable interface, and establish an Internet Protocol connection between the optical transceiver and an optical transceiver controller of the server.

In some implementations, the optical network includes a multicast virtualized local access network or a data communication network. The optical network device includes a router or a switch. The server includes a cloud-based server.

In some implementations, the optical network device is a hub node connected to one or or more leaf nodes in the optical network. The one or more leaf nodes are connected to a splitter that is connected to a line system of the optical network. The splitter is configured to receive data from the optical network device through the line system and direct the received data to each of the one or more leaf nodes.

In some implementations, the server includes an optical transceiver controller and a host device controller. The optical transceiver controller is configured to communicate with the service agent to perform the virtualized transport functions. The host device controller is configured to control selection of one or more of a setting, agreement, or service to be used for communications with the optical transceiver.

In some implementations, the virtualized transport functions include one or more of bandwidth management, network topology management, or optimizing performance of the optical network.

In some implementations, the host device controller is configured to perform layer 2 and layer 3 operations such that a layer 2/3 demarc is implemented within the server.

In some implementations, a Serializer/Deserializer (SerDes) interface coupling the optical network device and the optical transceiver is configured to provide a data path for communicating data between the server and the optical transceiver.

In some implementations, a first communication channel is configured to provide a data path for exchanging data between the optical transceiver and the server. A second communication channel is configured to provide a second path for communicating management and settings information between the optical transceiver and the server. The first communication channel and the second communication traverse the service agent.

According to some implementations, an optical network device includes a first port, a second port, and a management engine. The first port is configured to receive and connect to an optical transceiver. The second port is configured to connect to a server configured to remotely manage the optical transceiver through the optical network device. The management engine includes a service agent configured to communicate with the server and the optical transceiver to configure an IP interface between the server and optical transceiver and enable performance of virtualized transportation functions.

In some implementations, the virtualized transport functions include one or more of bandwidth management, network topology management, or optimizing performance of the optical network.

In some implementations, the service agent is configured to discover a connection of the optical transceiver with the optical network device through the first port that comprises a pluggable interface, and configured to establish an Internet Protocol connection between the optical transceiver and an optical transceiver controller of the server.

In some implementations, the optical network device is configured to receive, from the server, data indicative of a selection of one or more of a setting, agreement, or service to be used for communications between the server and the optical transceiver. The optical network device is also configured to transmit, to the optical transceiver, one or more portions of the data indicative of the selection of the one or more of the setting, agreement, or service, and configure communications between the server and the optical transceiver based on the selection of the one or more of the setting, agreement, or service.

In some implementations, the service agent is configured to transmit a multicase discovery message including ethertype information and a media access control address of an optical transceiver controller to the optical transceiver; receive, from the optical transceiver, a unicast discovery acknowledgement message that comprises a media access control address of the optical transceiver and an identification of a network type connected to the optical transceiver; and configure the IP interface based on the media access control address of the optical transceiver and the media access control address of the optical transceiver.

In some implementations, the optical network device includes a router or a switch. The server includes a cloud-based server. The optical transceiver is a pluggable optical transceiver.

In some implementations, the optical network interface is coupled to or comprises a Serializer/Deserializer (SerDes) interface connected to the optical transceiver to provide a data path for communicating data between the server and the optical transceiver.

According to some implementations, an optical network device includes a service agent processor. The service agent processor is configured to enable performance of virtualized transportation functions and to establish an Internet Protocol connection between an optical transceiver and a server that is configured to remotely manage the optical transceiver. The virtualized transport functions include one or more of bandwidth management, network topology management, or optimizing performance of an optical network connected to the optical network device.

In some implementations, a first communication channel is configured to provide a data path for exchanging data between the optical transceiver and the server. A second communication channel is configured to provide a second path for communicating management and settings information between the optical transceiver and the server. The first communication channel and the second communication traverse the service agent processor.

In some implementations, the optical network includes a multicast virtualized local access network or a data communication network. The optical network device includes a router or a switch. The server includes a cloud-based server.

In some implementations, the optical network device includes a first port, a second port, and a service agent processor. The first port is configured to connect to the optical transceiver through a pluggable interface. The second port is configured to connect to the server including an optical transceiver controller. The service agent processor is configured to: discover a connection of the optical transceiver with the optical network device through the first port; execute callbacks to integrating to the optical network device for sending and receiving link level frames to and from the optical transceiver; and communicate with the optical transceiver using organizationally unique identifier (OUI) extended EtherType frames.

Some implementations described herein can provide several solutions and advantages not available in current optical systems. For instance, by using the XR optical module described in this disclosure, a user can remotely manage communications between different optical network devices. Virtualized transport functions can be performed without the use of a physical transport device, which results in power, space, and cost savings. The XR optical module can be used as a coherent optical module to facilitate point to point or point to multipoint communications and can be used for out of band channel discovery. The XR optical module has packet parsing capabilities and is capable of supporting single fiber communications and/or passive optical network overlay.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a diagram of optical subcarriers depicted over a frequency domain spectrum.

Like reference numbers and designations in the various drawings indicate like elements.

DETAILED DESCRIPTION

Optical networks can include numerous devices including servers, user devices, nodes, and pluggable devices. Due to the dynamic nature of these networks, managing network operations and conditions is important to ensure smooth operation and data flow. For instance, when pluggable modules are plugged into a host optical network device, an operator typically goes on site to configure the devices and allocate functionalities to the pluggable module and host optical network device. However, requiring an operator to go on site to make changes to configurations or updates to software, can be problematic if the operator is not physically located close to the site of the host optical network device. Due to the lack of proximity, optical networks can suffer from bottlenecks and delays in upgrading systems.

To address such problems, systems, methods, and other implementations for remotely managing optical networks and devices, such as pluggable optical transceivers, are disclosed. This disclosure describes how remote management can be achieved through the use of a service agent in an optical network device, and how different channels of communications can be used to configure and manage an optical device (e.g., transceiver) and to send data to the optical device. Moreover, by implementing virtualized transport functions instead of using transport devices, the disclosed implementations advantageously reduce the amount of hardware, physical space, and power used in optical networks.

Figure 1:
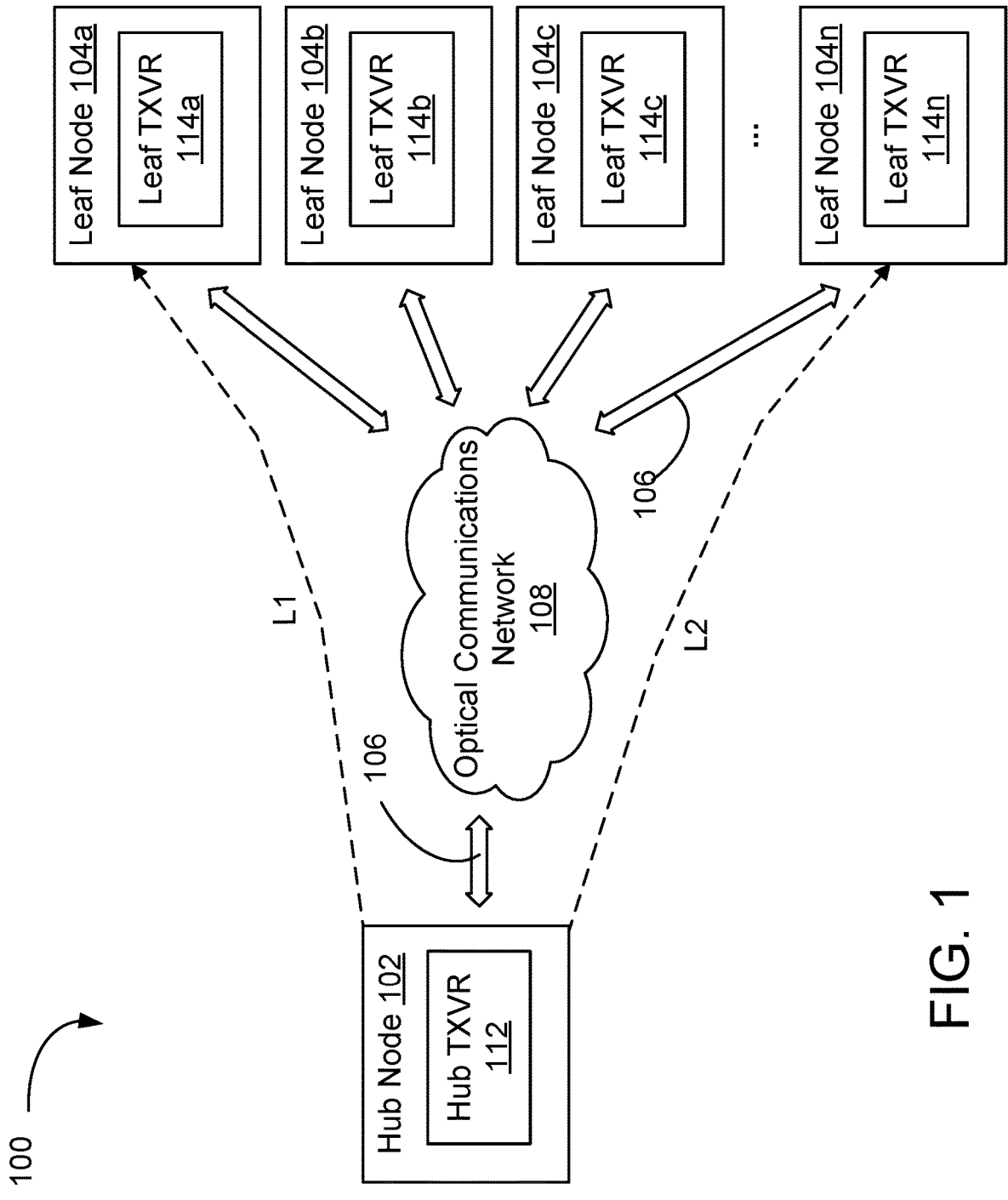
FIG. 1 is an illustration of an example communication system including a hub node, leaf nodes, and an optical communications network.

FIG. 1 depicts an example communication system 100. The communication system 100 can include wired and/or wireless communication systems, and, in some implementations, can be an optical communication network 108. The communication system 100 can be a point-to-point communication system or a point-to-multi-point communication system. For example, communication system 100 includes a hub node 102 and leaf nodes 104a-104n that are communicatively coupled to one another by optical links 106 in an optical communication network 108. In some implementations, the system 100 can be a part of one or more optical transport networks (OTNs) and/or can include one or more OTNs.

Each of the network nodes 102 and 104a-104n can include one or more respective computer devices (e.g., server computer, router, client computer, laptop, desktop). In some implementations, the network nodes can be configured such that each of the network nodes transmits data to and/or receives data from one or more other network nodes. As an example, the hub node 102 can be configured to transmit data to and/or receive data from one or more of the leaf nodes 104a-104n. For instance, hub node 102 can transmit data over an optical link L1 to leaf node 104a and transmit data over another optical link L2 to leaf node 104n. System 100 can include any number of network nodes greater than one (e.g., two, three, four, or more).

Each of the network nodes 102 and 104a-104n can include one or more transmitters and one or more receivers (which, in some implementations, can be combined as one or more transceivers) for transmitting and/or receiving data via the optical links 106 and the optical communications network 108. As an example, the hub node 102 can include a hub transceiver 112 that is coupled to one or more optical links 106. As another example, each of the leaf nodes 104a-104n can include a respective leaf transceiver 114a-114n that is coupled to one or more of the optical links 106. Each of the optical links 106 can be implemented using one or more lengths of optical fiber and/or equipment interconnecting the optical fiber (e.g., line system components). In some implementations, the optical links 106 can collectively define at least a portion of the optical communications network 108.

Figure 7:
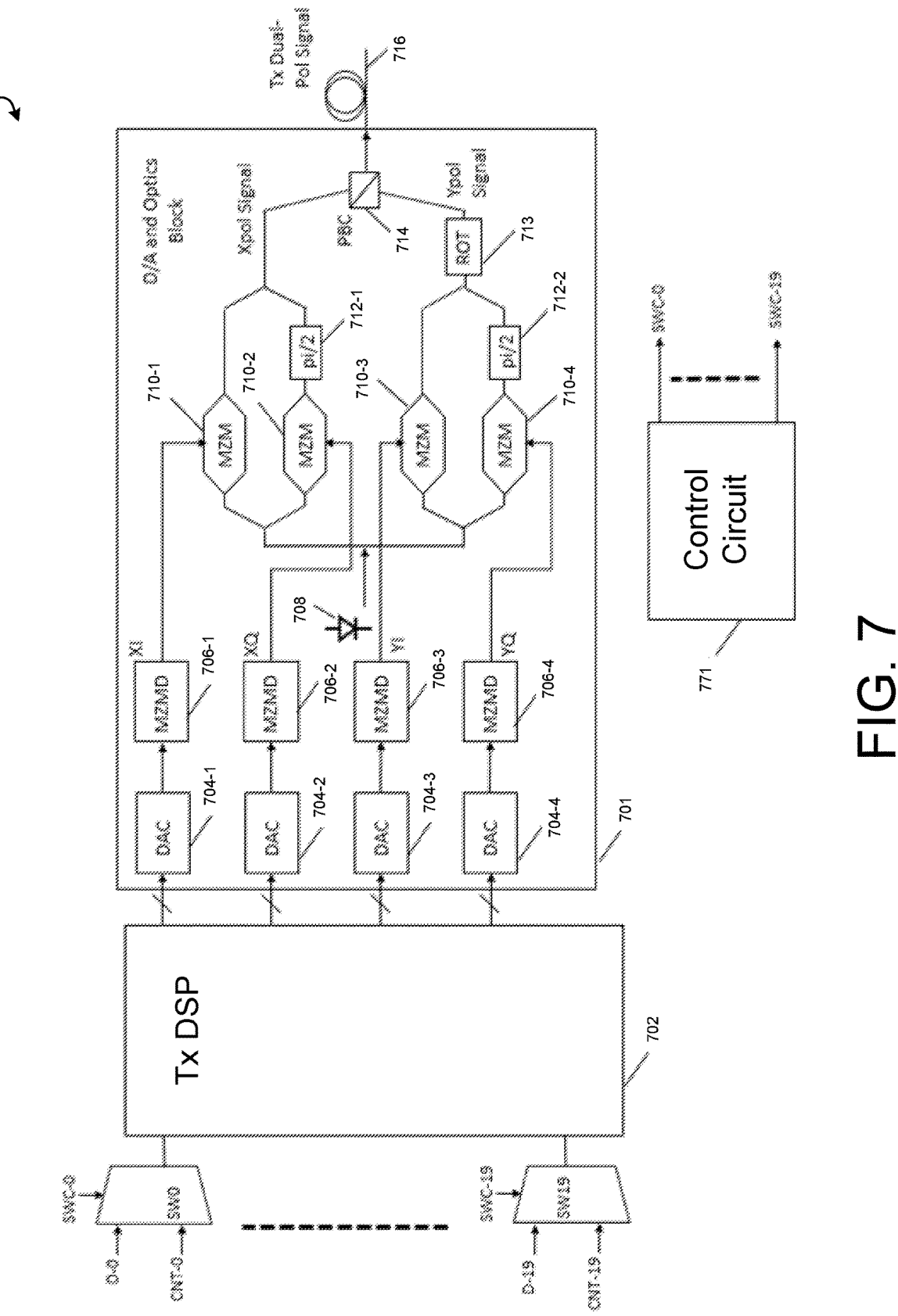
FIG. 7 depicts a block diagram of an example transmitter.

Example implementations of a transmitter and receiver are described with respect to FIGS. 7-10. FIG. 7 depicts an example transmitter 700 that includes a plurality of switches SW and circuits that include a transmitter Digital Signal Processor DSP (Tx DSP) 702 and a Digital-to-Analog (D/A) and optics block 701. In some cases, transmitter 700 can be part of any one of transceivers 112, 114a-114n shown in FIG. 1. In the example shown in FIG. 7, twenty switches (SW-0 to SW-19) are shown, although more or fewer switches can be used. Each switch SW can, in some instances, have two inputs: the first input can receive user data, and the second input can receive control information or signals (CNT). Each switch SW-0 to SW-19 can receive a respective one of control signals SWC-0 to SWC-19 output from control circuit 771, which can include a microprocessor, field programmable gate array (FPGA), or other processor circuit. Based on the received control signal, each switch SW-0 to SW19 can selectively output any one of the data streams D-0 to D-19, or a control signal CNT-0 to CNT-19. Control signals CNT can be any combination of configuration bits for control and/or monitoring purposes.

For example, control signals CNT can include instructions to one or more of leaf nodes 104a, 104b, 104c, 104d to change the data output from such leaf nodes, such as by identifying the subcarriers associated with such data. In another example, the control signals can include a series of known bits used in leaf nodes 104a, 104b, 104c, 104d to "train" a receiver to detect and process such bits so that the receiver can further process subsequent bits. In a further example, the control channel CNT can include information that can be used by the polarization mode dispersion (PMD) equalizer circuits to correct for errors resulting from polarization rotations of the X and Y components of one or more subcarriers (SC). In another example, control information CNT can be used to restore or correct phase differences between laser transmit-side laser 708 and a local oscillator laser in each of the leaf nodes 104a, 104b, 104c, 104d. In a further example, control information CNT can be used to recover, synchronize, or correct timing differences between clocks provided in the hub node 102 and leaf nodes 104a, 104b, 104c, 104d.

In another example, one or more of switches SW can be omitted, and control signals CNT can be supplied directly to DSP 702. Moreover, each input to DSP 702, such as the inputs to FEC encoders 802 described below (see FIG. 8), receives, in another example, a combination of control information described above as well as user data.

In a further example, control signal CNT includes information related to the number of subcarriers that can be output from each of leaf nodes 104a, 104b, 104c, 104d. Circuits, such as DSP 702, can similarly be included in a leaf node Tx DSP to adjust or control the number of subcarriers output therefrom.

Based on the outputs of switches SW-0 to SW-19, DSP 702 can supply a plurality of outputs to D/A and optics block 701 including digital-to-analog conversion (DAC) circuits 704-1 to 704-4, which convert digital signal received from DSP 702 into corresponding analog signals. D/A and optics block 701 also includes driver MZMD circuits 706-1 to 706-4 that receive the analog signals from DACs 704-1 to 704-4 and adjust the voltages or other characteristics thereof to provide drive signals to a corresponding one of modulators 710-1 to 710-4.

Each of the modulators 710-1 to 710-4 can be a Mach-Zehnder modulator (MZM) that modulates the phase and/or amplitude of the light output from laser 708. The optical light signal output from laser 708, also included in block 701, is split such that a first portion of the light is supplied to a first MZM pairing, including MZMs 710-1 and 710-2, and a second portion of the light is supplied to a second MZM pairing, including MZMs 710-3 and 710-4. The first portion of the optical light signal is split further into third and fourth portions, such that the third portion is modulated by MZM 710-1 to provide an in-phase (I) component of an X (or TE) polarization component of a modulated optical signal, and the fourth portion is modulated by MZM 710-2 and fed to phase shifter 712-1 to shift the phase of such light by 90 degrees in order to provide a quadrature (Q) component of the X polarization component of the modulated optical signal. Similarly, the second portion of the optical light signal is further split into fifth and sixth portions, such that the fifth portion is modulated by MZM 710-3 to provide an I component of a Y (or TM) polarization component of the modulated optical signal, and the sixth portion is modulated by MZM 710-4 and fed to phase shifter 712-2 to shift the phase of such light by 90 degrees to provide a Q component of the Y polarization component of the modulated optical signal.

The optical outputs of MZM 710-1 and phase shifter 712-1 are combined to provide an X polarized optical signal including I and Q components and are fed to a polarization beam combiner (PBC) 714. In addition, the outputs of MZM 710-3 and phase shifter 712-2 are combined to provide an optical signal that is fed to polarization rotator 713 that rotates the polarization of such optical signal to provide a modulated optical signal having a Y (or TM) polarization. The Y polarized modulated optical signal also is provided to PBC 714, which combines the X and Y polarized modulated optical signals to provide a polarization multiplexed ("dual-poi") modulated optical signal onto optical fiber 716, for example, which can be included as a segment of optical fiber in an optical communication path.

Figure 8:
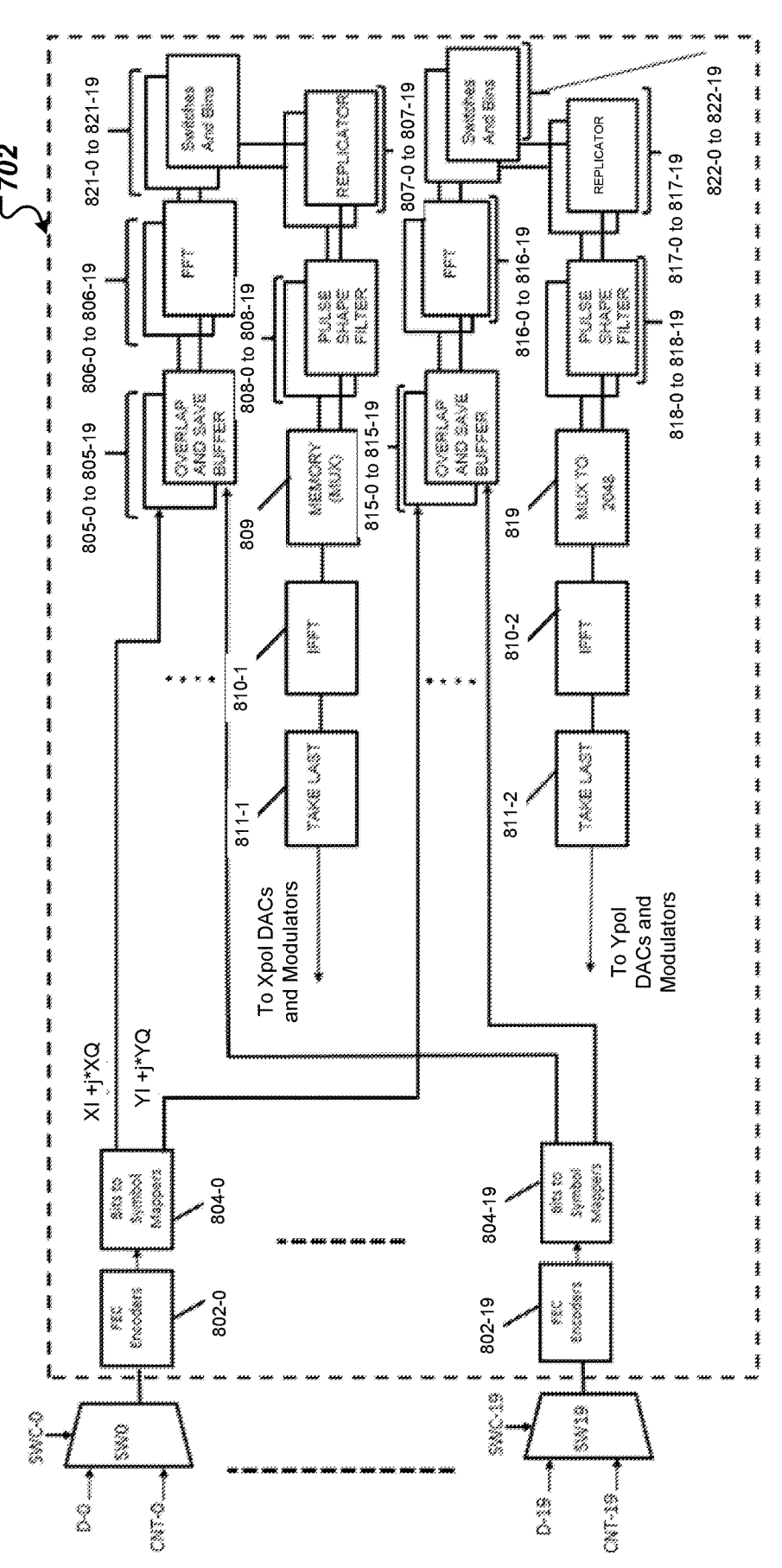
FIG. 8 depicts a block diagram of an example digital signal processor of the transmitter shown in FIG. 7.

FIG. 8 shows an example of Tx DSP 702 in greater detail. Tx DSP 702 can include FEC encoders 802-0 to 802-19, each of which can receive a respective one of a plurality of the outputs from switches SW0 to SW19. The switches SW0 to SW19 can receive data streams D-0 to D-19, control signals CNT-0 to CNT-19, and subcarriers SC0 to SC19, which each have X and Y polarization components and I and Q components. Each subcarrier SC0 to SC19 can be associated with or corresponds to a respective one of the outputs of switches SW-0 to SW-19. In one example, switches SW2, SW7, SW12 can supply control information carried by a respective one of control signals CNT-2, CNT-7, CNT-12. Based on such control signals, DSP 702 provides outputs that result in optical subcarriers SC2, SC7, SC12 carrying data indicative of the control information carried by CNT-2, CNT-7, CNT-12, respectively. In addition, remaining subcarriers SC0, SC1, SC3 to SC6, SC8 to SC11, SC13 to SC19 carry information indicative of a respective one of data streams D-0, D-1, D-3 to D-6, D-8 to D-11, D-13 to D-19 output from a corresponding one of switches SW0, SW1, SW3 to SW-6, SW-8 to SW11, SW13 to SW19.

FEC encoders 802-0 to 802-19 can perform forward error correction coding on a corresponding one of the switch outputs, such as, by adding parity bits to the received data. In addition, FEC encoders 802-0 to 802-19 can interleave data.

Each of FEC encoders 802-0 to 802-19 provides an output to a corresponding one of a plurality of bits-to-symbol circuits, 804-0 to 804-19 (collectively referred to herein as "804"). Each of bits-to-symbol mapping circuits (mappers) 804 can map the m encoded bits to symbols (where m is a whole number greater than or equal to 2) on a complex plane.

In some implementations, the bits-to-symbol mappers 804 can map four bits (m=4) to an X symbol+Y symbol in a dual-polarization QPSK constellation. Each of bits-to-symbol mappers 804 provide first symbols, having the complex representation XI+j*XQ, associated with a respective one of the switch outputs, such as D-0, to DSP 702. Data indicative of such first symbols is carried by the X polarization component of each subcarrier SC0-SC19.

Each of bits-to-symbol mappers 804 further can provide second symbols having the complex representation YI+j*YQ, also associated with a corresponding output of switches SW0-SW19. Data indicative of such second symbols, however, is carried by the Y polarization component of each of subcarriers SC-0 to SC-19.

Such mapping, as performed by mappers 804-0 to 804-19 provides, in one example, a particular modulation format for each subcarrier. That is, such circuit can configure a mapping for all the optical subcarrier that is indicative of a binary phase shift keying (BPSK) modulation format, a quadrature phase shift keying (QPSK) modulation format, or an m-quadrature amplitude modulation (QAM, where m is a positive integer, e.g., 4, 8, 16, or 64) format. In another example, one or more of the optical subcarriers can have a modulation format that is different than the modulation format of other optical subcarriers. That is, one of the optical subcarriers can have a QPSK modulation format and another optical subcarrier can have a different modulation format, such as 8-QAM or 16-QAM. In another example, one of the optical subcarriers has an 8-QAM modulation format and another optical subcarrier has a 16 QAM modulation format. Accordingly, although all the optical subcarriers can carry data at the same data and or baud rate, consistent with an aspect of the present disclosure one or more of the optical subcarriers can carry data at a different data or baud rate than one or more of the other optical subcarriers. Moreover, modulation formats, baud rates and data rates can be changed over time depending on, for example, capacity requirements. Adjusting such parameters can be achieved, for example, by applying appropriate signals to mappers 804 based on control information or data described herein and the communication of such data as further disclosed herein between primary and secondary nodes.

As further shown in FIG. 8, each of the first symbols output from each of bits-to-symbol mappers 804 is supplied to a respective one of first overlap and save buffers 805-0 to 805-19 (collectively referred to herein as overlap and save buffers 805) that can buffer, for example, 256 symbols. Each of overlap and save buffers 805 can receive, for example, 128 of the first symbols or another number of such symbols at a time from a corresponding one of bits-to-symbol mappers 804. Thus, overlap and save buffers 805 can combine, for example, 128 new symbols from bits to symbol circuits 805, with the previous 128 symbols received from bits to symbol circuits 805.

Each overlap and save buffer 805 can supply an output, which is in the time domain, to a corresponding one of fast Fourier Transform (FFT) circuits 806-0 to 806-19 (collectively referred to as "FFTs 806"). In one example, the output includes 256 symbols or another number of symbols. Each of FFTs 806 can convert the received symbols to the frequency domain using or based on, for example, a fast Fourier transform. Each of FFTs 806 can provide the frequency domain data to bins and switches blocks 821-0 to 821-19. Bins and switches blocks 821 can include, for example, memories or registers, also referred to as frequency bins (FB) or points, that store frequency components associated with each subcarrier SC.

Each switch SW can selectively supply either frequency domain data output from one of FFT circuits 806-0 to 806-19 or a predetermined value, such as 0. In order to block or eliminate transmission of a particular subcarrier, the switches SW associated with the group of frequency bins FB associated with that subcarrier are configured to supply the zero value to corresponding frequency bins. Replicator components 807 as well as other components and circuits in DSP 702 can further process the zero (0) values to provide drive signals to modulators 710, such that subcarrier SC$_0$ is omitted from the optical output from the modulators.

On the other hand, some switches SW' (not shown) can be configured to supply the outputs of FFTs 806, i.e., frequency domain data FD, to corresponding frequency bins FB. Further processing of the contents of frequency bins FB by replicator components 807 and other circuits in DSP 702 can result in drive signals supplied to modulators 710, whereby, based on such drive signals, optical subcarriers are generated that correspond to the frequency bin groupings associated with that subcarrier.

Each of replicator components or circuits 807-0 to 807-19 can replicate the contents of the frequency bins FB and store such contents (e.g., for T/2 based filtering of the subcarrier) in a respective one of the plurality of replicator components. Such replication can increase the sample rate. In addition, replicator components or circuits 807-0 to 807-19 can arrange or align the contents of the frequency bins to fall within the bandwidths associated with pulse shaped filter circuits 808-0 to 808-19 described below.

Each of pulse shape filter circuits 808-0 to 808-19 can apply a pulse shaping filter to the data stored in the frequency bins of a respective one of the plurality of replicator components or circuits 807-0 to 807-19 to thereby provide a respective one of a plurality of filtered outputs, which are multiplexed and subject to an inverse FFT, as described below. Pulse shape filter circuits 808-1 to 808-19 calculate the transitions between the symbols and the desired subcarrier spectrum so that the subcarriers can be packed together spectrally for transmission, e.g., with a close frequency separation. Pulse shape filter circuits 808-0 to 808-19 also can be used to introduce timing skew between the subcarriers to correct for timing skew induced by links between nodes in the transmitter 100, for example. Multiplexer component 809, which can include a multiplexer circuit or memory, can receive the filtered outputs from pulse shape filter circuits 808-0 to 808-19, and multiplex or combine such outputs together to form an element vector.

Next, IFFT circuit or component 810-1 can receive the element vector and provide a corresponding time domain signal or data based on an inverse fast Fourier transform (IFFT). In one example, the time domain signal can have a rate of 64 GSample/s. Take last buffer or memory circuit 811-1, for example, can select the last 1024 samples, or another number of samples, from an output of IFFT component or circuit 810-1 and supply the samples to DACs 704-1 and 704-2 (see FIG. 7) at 64 GSample/s, for example. As noted above, DAC 704-1 is associated with the in-phase (I) component of the X pol signal, and DAC 704-2 is associated with the quadrature (Q) component of the X pol signal. Accordingly, consistent with the complex representation XI+jXQ, DAC 704-1 receives values associated with XI and DAC 704-2 receives values associated with jXQ. As indicated by FIG. 7, based on these inputs, DACs 704-1 and 704-2 can provide analog outputs to MZMD 706-1 and MZMD 706-2, respectively, as discussed above.

As further shown in FIG. 8, each of bits-to-symbol mapping circuits (mappers) 804-0 to 804-19 can output a corresponding one of symbols indicative of data carried by the Y polarization component of the polarization multiplexed modulated optical signal output on fiber 116. As further noted above, these symbols can have the complex representation YI+j*YQ. Each such symbol can be processed by a respective one of overlap and save buffers 815-0 to 815-19, a respective one of FFT circuits 816-0 to 816-19, a respective one of replicator components or circuits 817-0 to 817-19, pulse shape filter circuits 818-0 to 818-19, multiplexer or memory 819, IFFT 810-2, and take last buffer or memory circuit 811-2, to provide processed symbols having the representation YI+j*YQ in a manner similar to or the same as that discussed above in generating processed symbols XI+j*XQ output from take last circuit 811-1. In addition, symbol components YI and YQ are provided to DACs 704-3 and 704-4 (FIG. 7), respectively. Based on these inputs, DACs 704-3 and 704-4 can provide analog outputs to MZMD 706-3 and MZMD 706-4, respectively, as discussed above.

While FIG. 8 shows DSP 702 as including a particular number and arrangement of functional components, in some implementations, DSP 702 can include additional functional components, fewer functional components, different functional components, or differently arranged functional components. In addition, typically the number of overlap and save buffers, FFTs, replicator circuits, and pulse shape filters associated with the X component can be equal to the number of switch outputs, and the number of such circuits associated with the Y component can also be equal to the number of switch outputs. However, in other examples, the number of switch outputs can be different from the number of these circuits.

As noted above, based on the outputs of MZMDs 706-1 to 706-4, a plurality of optical subcarriers $SC_0$ to $SC_{19}$ can be output onto optical fiber 716 (FIG. 7).

Figure 9:
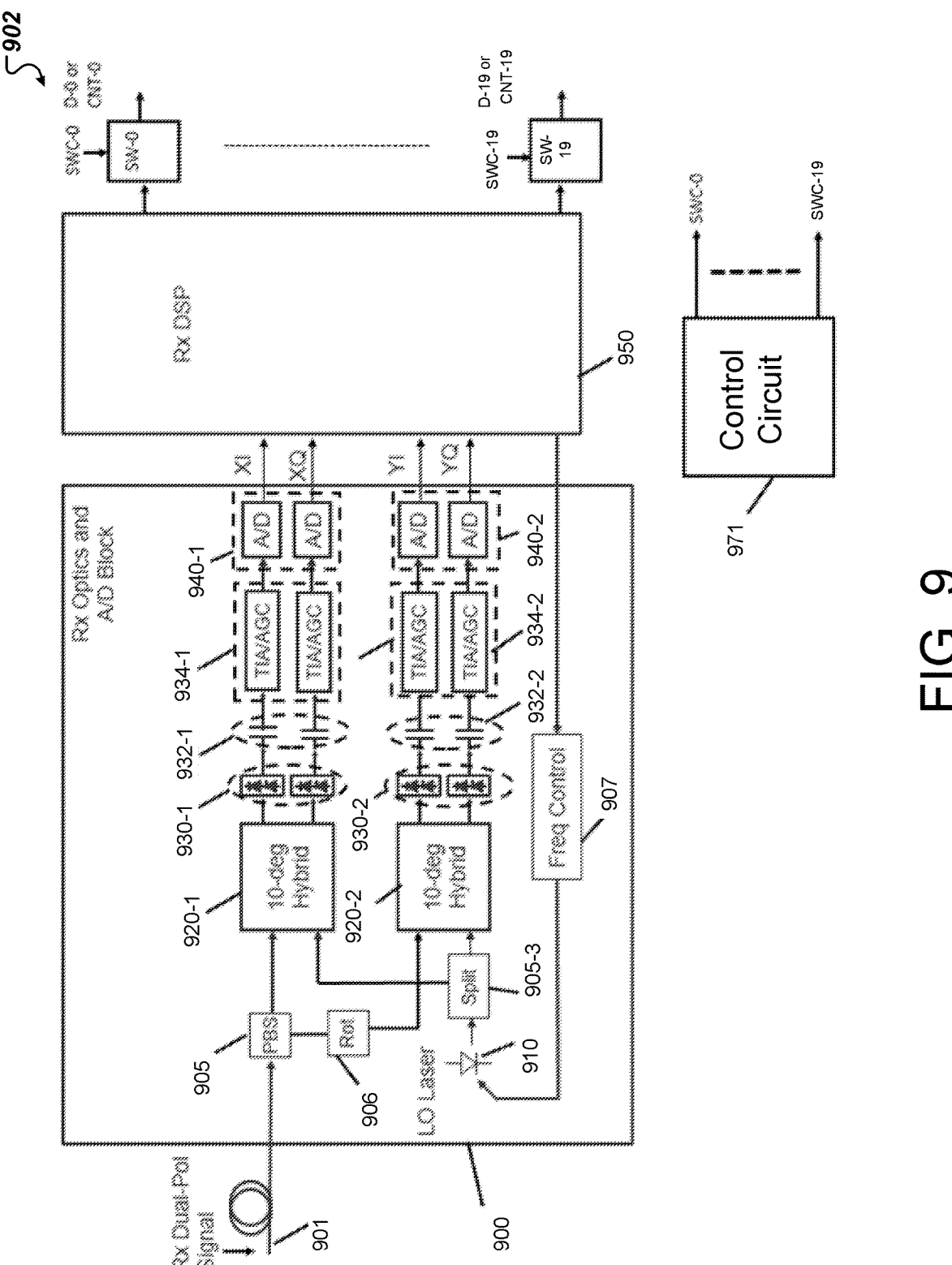
FIG. 9 a block diagram of an example receiver.

FIG. 9 depicts an example of a receiver Rx such as receiver 902 that includes an Rx optics and A/D block 900 and Rx DSP 950 to receive signals transmitted over optical fiber 716 and to perform coherent detection. In some cases, receiver 902 can be part of any one of transceivers 112, 114a-114n shown in FIG. 1.

The Rx optics and A/D block 900 can include a polarization splitter (PBS) 905 with first and second outputs, a splitter 905-3, a local oscillator (LO) laser 910, 10 degree optical hybrid circuits or mixers 920-1 and 920-2 (referred to generally as hybrid mixers 920 and individually as hybrid mixer 920), detectors 930-1 and 930-2 (referred to generally as detectors 930 and individually as detector 930, each including either a single photodiode or balanced photodiode), AC coupling capacitors 932-1 and 932-2, transimpedance amplifiers/automatic gain control circuits TIA/AGC 934-1 and 934-2, ADCs 940-1 and 940-2 (referred to generally as ADCs 940 and individually as ADC 940).

Polarization beam splitter (PBS) 905 can include a polarization splitter that receives an input polarization multiplexed optical signal including optical subcarriers $SC_0$ to $SC_{19}$ supplied by optical fiber link 901, which can be, for example, an optical fiber segment as part of the optical communication network 108 or optical fiber 716. PBS 905 can split the incoming optical signal into the two X and Y orthogonal polarization components. The Y component can be supplied to a polarization rotator 906 that rotates the polarization of the Y component. Hybrid mixers 920 can receive and combine the X and rotated Y polarization components with light from local oscillator laser 910, which, in one example, is a tunable laser. For example, hybrid mixer 920-1 can combine a first polarization signal (e.g., the component of the incoming optical signal having a first or X (TE) polarization output from a first PBS port with light from local oscillator 910, and hybrid mixer 920-2 can combine the rotated polarization signal (e.g., the component of the incoming optical signal having a second or Y (TM) polarization output from a second PBS port) with the light from local oscillator 910. In one example, polarization rotator 910 can be provided at the PBS output to rotate the Y component polarization.

Detectors 930 can detect mixing products output from the optical hybrid mixers 920, to form corresponding voltage signals, which are subject to AC coupling by capacitors 932-1 and 932-1, as well as amplification and gain control by TIA/AGCs 934-1 and 934-2. The outputs of TIA/AGCs 934-1 and 934-2 and ADCs 940 can convert the voltage signals to digital samples. For example, two detectors (e.g., photodiodes) 930-1 can detect the X polarization signals to form the corresponding voltage signals, and a corresponding two ADCs 940-1 can convert the voltage signals to digital samples for the first polarization signals after amplification, gain control and AC coupling. Similarly, two detectors 930-2 can detect the rotated Y polarization signals to form the corresponding voltage signals, and a corresponding two ADCs 940-2 can convert the voltage signals to digital samples for the second polarization signals after amplification, gain control and AC coupling. Rx DSP 950 can process the digital samples associated with the X and Y polarization components to output data associated with one or more subcarriers within a group of subcarriers.

While FIG. 9 shows receiver 902 as including a particular number and arrangement of components, in some implementations, receiver 902 can include additional components, fewer components, different components, or differently arranged components. The number of detectors 930 and/or ADCs 940 can be selected to implement an receiver 902 that is capable of receiving a polarization multiplexed signal. In some instances, one of the components illustrated in FIG. 9 can carry out a function described herein as being carry out by another one of the components illustrated in FIG. 9.

Consistent with the present disclosure, in order to select a particular subcarrier or group of subcarriers at a secondary node 112, local oscillator 910 can be tuned to output light having a wavelength or frequency relatively close to the selected subcarrier wavelength(s) to thereby cause a beating between the local oscillator light and the selected subcarrier(s). Such beating will either not occur or will be significantly attenuated for the other non-selected subcarriers so that data carried by the selected subcarrier(s) is detected and processed by Rx DSP 950.

The local oscillator frequency can be tuned, for example, by changing the temperature of the local oscillator laser 910 to realize corresponding shifts in the bandwidth to encompass a different group of subcarriers than were detected prior to such bandwidth shift. The temperature of the local oscillator laser 910 can be controlled with a thin film heater. Alternatively, the local oscillator laser can be frequency tuned by controlling the current supplied to the laser 910. The local oscillator laser 910 can be a semiconductor laser, such as a distributed feedback laser or a distributed Bragg reflector laser.

As further shown in FIG. 9, switches or circuits SW-0 to SW-19 can be provided at the output of Rx DSP 950 to selectively output the data detected from the received subcarriers based on a respective one of control signals CNT-0 to CNT-19 output from control circuit 971, which, like control circuit 771 (see FIG. 7) can include a microprocessor, FPGA, or other processor circuit. Control signals can designate the output of each respective switch. Accordingly, for example, if data carried by predetermined subcarriers is intended to be output at a particular leaf node 104*a*, 104*b*, 104*c*, 104*d*, switches SW at that leaf node can be configured, based on the received control signals CNT, to supply the desired data, but block data not intended for that node.

Figure 10:
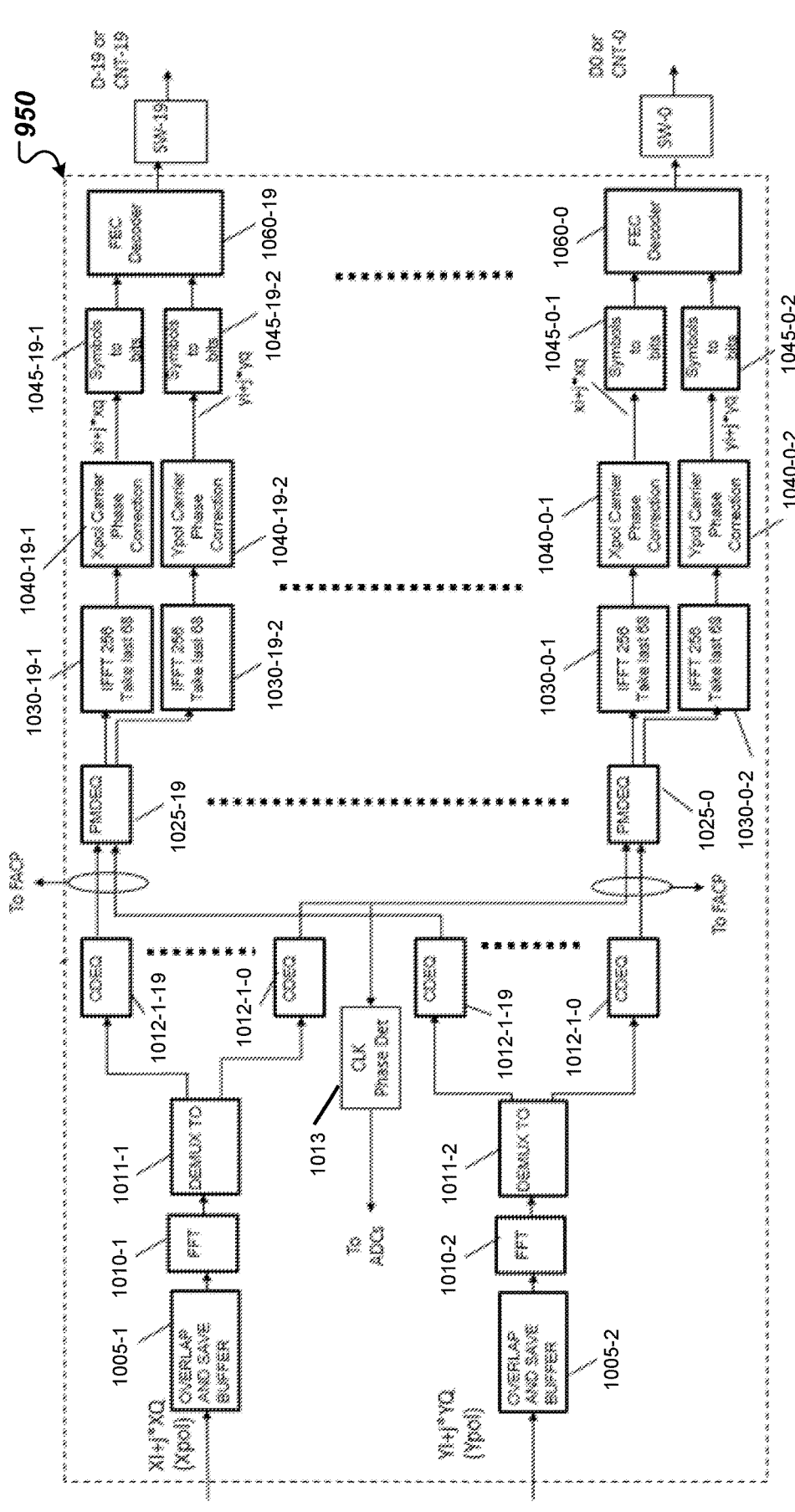
FIG. 10 depicts a block diagram of an example digital signal processor of the receiver shown in FIG. 9.

FIG. 10 illustrates exemplary components of the Rx DSP 950. As noted above, analog-to-digital (A/D) circuits 940-1 and 940-2 (FIG. 9) output digital samples corresponding to the analog inputs supplied thereto. In one example, the samples can be supplied by each A/D circuit at a rate of 64 GSamples/s. The digital samples may correspond to symbols carried by the X polarization of the optical subcarriers and can be represented by the complex number $XI+jXQ$. The digital samples can be provided to overlap and save buffer 1005-1, as shown in FIG. 10. FFT component or circuit 1010-1 can receive the 2048 vector elements from the overlap and save buffer 1005-1 and convert the vector elements to the frequency domain using, for example, a fast Fourier transform (FFT). The FFT component 1010-1 can convert the 2048 vector elements to 2048 frequency components, each of which can be stored in a register or "bin" or other memory, as a result of carrying out the FFT.

The frequency components can be demultiplexed by demultiplexer 1011-1, and groups of such components can be supplied to a respective one of chromatic dispersion equalizer circuits CDEQ 1012-1-0 to 1012-1-19, each of which can include a finite impulse response (FIR) filter that corrects, offsets or reduces the effects of, or errors associated with, chromatic dispersion of the transmitted optical subcarriers. Each of CDEQ circuits 1012-1-0 to 1012-1-19 supplies an output to a corresponding polarization mode dispersion (PMD) equalizer circuit 1025-0 to 1025-19 (which individually or collectively can be referred to as 1025). Without loss of generality, PMD equalization can be done in frequency domain or in time domain after IFFT 1030 and before carrier phase correction 1040.

Digital samples output from A/D circuits 540-2 associated with Y polarization components of subcarrier SC1 can be processed in a similar manner to that of digital samples output from A/D circuits 540-1 and associated with the X polarization component of each subcarrier. Namely, overlap and save buffer 1005-2, FFT 1010-2, demultiplexer 1011-2, and CDEQ circuits 1012-2-0 to 1012-2-19 can have a similar structure and operate in a similar fashion as buffer 1005-1, FFT 1010-1, demultiplexer 1011-1, and CDEQ circuits 1012-1-0 to 1012-1-19, respectively. For example, each of CDEQ circuits 1012-2-0 to 1012-19 can include an FIR filter that corrects, offsets, or reduces the effects of, or errors associated with, chromatic dispersion of the transmitted optical subcarriers. In addition, each of CDEQ circuits 1012-2-0 to 1012-2-19 provide an output to a corresponding one of PMDEQ 1025-0 to 1025-19.

As further shown in FIG. 10, the output of one of the CDEQ circuits, such as CDEQ 1012-1-0 can be supplied to clock phase detector circuit 1013 to determine a clock phase or clock timing associated with the received subcarriers. Such phase or timing information or data can be supplied to ADCs 540-1 and 540-2 to adjust or control the timing of the digital samples output from ADCs 540-1 and 540-2.

Each of PMDEQ circuits 1025 can include another FIR filter that corrects, offsets or reduces the effects of, or errors associated with, PMD of the transmitted optical subcarriers. Each of PMDEQ circuits 1025 can supply a first output to a respective one of IFFT components or circuits 1030-0-1 to 1030-19-1 and a second output to a respective one of IFFT components or circuits 1030-0-2 to 1030-19-2, each of which can convert a 256-element vector, in this example, back to the time domain as 256 samples in accordance with, for example, an inverse fast Fourier transform (IFFT).

Time domain signals or data output from IFFT 1030-0-1 to 1030-19-1 are supplied to a corresponding one of XpoI carrier phase correction circuits 1040-0-1 to 1040-19-1, which can apply carrier recovery techniques to compensate for X polarization transmitter (e.g., laser 708) and receiver (e.g., local oscillator laser 910) linewidths. In some implementations, each carrier phase correction circuit 1040-0-1 to 1040-19-1 can compensate or correct for frequency and/or phase differences between the X polarization of the transmit signal and the X polarization of light from the local oscillator 510 based on an output of XpoI carrier recovery circuits 1040-0-1 to 1040-19-1, which performs carrier recovery in connection with one of the subcarrier based on the outputs of IFFTs 1030-0-1 to 1030-19-1. After such X polarization carrier phase correction, the data associated with the X polarization component can be represented as symbols having the complex representation xi+j*xq in a constellation, such as a QPSK constellation or a constellation associated with another modulation formation, such as an m-quadrature amplitude modulation (QAM), m being an integer. In some implementations, the taps of the FIR filter included in one or more of PMDEQ circuits 1025 can be updated based on the output of at least one of carrier phase correction circuits 1040-0-1 to 1040-19-01.

In a similar manner, time domain signals or data output from IFFT 1030-0-2 to 1030-19-2 are supplied to a corresponding one of Ypol carrier phase correction circuits 1040-0-2 to 1040-19-2, which can compensate or correct for Y polarization transmitter (e.g., laser 708) and receiver (e.g., local oscillator laser 910) linewidths. In some implementations, each carrier phase correction circuit 1040-0-2 to 1040-19-2 also can correct or compensate for frequency and/or phase differences between the Y polarization of the transmit signal and the Y polarization of light from the local oscillator 510. After such Y polarization carrier phase correction, the data associated with the Y polarization component can be represented as symbols having the complex representation yi+j*yq in a constellation, such as a QPSK constellation or a constellation associated with another modulation formation, such as an m-quadrature amplitude modulation (QAM), m being an integer. In some implementations, the output of one of circuits 1040-0-2 to 1040-19-2 can be used to update the taps of the FIR filter included in one or more of PMDEQ circuits 1025 instead of, or in addition to, the output of at least one of the carrier recovery circuits 1040-0-1 to 1040-19-1.

The equalizer, carrier recovery, and clock recovery can be further enhanced by utilizing the known (training) bits that can be included in control signals CNT, for example by providing an absolute phase reference between the transmitted and local oscillator lasers.

Each of the symbols-to-bits circuits or components 1045-0-1 to 1045-19-1 can receive the symbols output from a corresponding one of circuits 1040-0-1 to 1040-19-1 and map the symbols back to bits. For example, each of the symbol-to-bits components 1045-0-1 to 1045-19-1 can demap one X polarization symbol, in a QPSK or m-QAM constellation, to Z bits, where Z is an integer. For dual-polarization QPSK modulated subcarriers, Z is two. Bits output from each of component 1045-0- 1 to 1045-19-1 are provided to a corresponding one of FEC decoder circuits 1060-0 to 1060-19.

Y polarization symbols are output form a respective one of circuits 1040-0-2 to 1040-19-2, each of which has the complex representation yi+j*yq associated with data carried by the Y polarization component. Each Y polarization, like the X polarization symbols noted above, can be provided to a corresponding one of symbols-to-bits circuits or components (demappers) 1045-0-2 to 1045-19-2, each of which has a similar structure and operates in a similar manner as symbols-to-bits component 1045-0-1 to 1045-19-1. Each of circuits 1045-0-2 to 1045-19-2 can provide an output to a corresponding one of FEC decoder circuits 1060-0 to 1060-19.

Each of FEC decoder circuits 1060 can remove errors in the outputs of symbol-to-bit circuits 1045 using, for example, forward error correction. Such error corrected bits, which can include user data for output, can be supplied to a corresponding one of switch circuits SW-0 to SW-19. As noted above, switch circuits SW-0 to SW-19 in each leaf node 104a, 104b, 104c, 104d can selectively supply or block data based on whether such data is intended to be output at the leaf node. In addition, if one of the received subcarriers' control information (CNT), such as information identifying switches SW that output data and other switches SW that block data, the control information can be output from one of the switches and, based on such control information, control circuit 971 in the leaf nodes to generate the control signals CNT.

Consistent with another aspect of the present disclosure, data can be blocked from output from Rx DSP 950 without the use of switches SW-0 to SW-19. In one example similar to an example described above, zero (0) or other predetermined values can be stored in frequency bins associated with the blocked data, as well as the subcarrier corresponding to the blocked data. Further processing described above of such zeroes or predetermined data by circuitry in Rx DSP 950 can result in null or zero data outputs, for example, from a corresponding one of FEC decoders 1060. Switch circuits provided at the outputs of FFTs 1010-1 and 1010-2, like switch circuits SW described above in FIG. 8, can be provided to selectively insert zeroes or predetermined values for selectively blocking corresponding output data from DSP 950. Such switches also can be provided at the output of or within demultiplexers 1011-1 and 1011-2 to selectively supply zero or predetermined values.

In another example, zeroes (0s) can be inserted in chromatic dispersion equalizer (CDEQ) circuits 1012 associated with both the X and Y polarization components of each subcarrier. In particular, multiplier circuits (provided in corresponding butterfly filter circuits), like multiplier circuits M described above, can selectively multiply the inputs to the CDEQ circuit 1012 by either zero or a desired coefficient. Multiplication by a zero generates a zero product. When such zero products are further processed by corresponding circuitry in DSP 950, e.g., corresponding IFFTs 1030, carrier phase correction components 1040, symbol-to-bits components 1045, and FEC decoder 1060, a corresponding output of DSP 950 will also be zero. Accordingly, data associated with a subcarrier SC received by a leaf node receiver, but not intended for output from that receiver, can be blocked.

If, on the other hand, capacity requirements change and such previously blocked data is to be output from a given leaf node receiver DSP (e.g., DSP 950), appropriately coefficients can be supplied to the multiplier circuits, such that at least some of the inputs thereto are not multiplied by zero. Upon further processing, as noted above, data associated with the inputs to the multiplier circuits and corresponding to a particular subcarrier SC is output from leaf node receiver DSP (e.g., DSP 950).

While FIG. 10 shows DSP 950 as including a particular number and arrangement of functional components, in some implementations, DSP 950 can include additional functional components, fewer functional components, different functional components, or differently arranged functional components.

Referring back to FIG. 1, in some implementations, a network node can transmit data by generating optical signals that are modulated according to one or more optical subcarriers that are associated with the intended destination or destinations of the data. For example, the hub node 102 can receive data packets (e.g., from the hub node 102 itself and/or from another network node or user device), ascertain the intended destination of each of the data packets, and identify one or more respective optical subcarriers that can be used to transmit data to each of those destinations. Based on this information, the hub node 102 can generate one or more optical signals (e.g., using one or more light emitters, such as laser emitters), modulate the optical signals according to the identified optical subcarriers (e.g., using one or more local oscillators, multiplexers, etc.), and transmit the modulated optical signals over one or more optical links to each of the intended destinations (e.g., one or more of the leaf nodes 104-104n).

The hub node 102 includes several components including a hub transceiver 112 that can generate one or more optical signals, and transmit the optical signals (e.g., via one or more egress network interfaces) to the optical communications network 108. For example, hub transceiver 112 can generate an optical signal that is modulated according to multiple sets of optical subcarriers (e.g., SC Groups 1-4), where each set of optical subcarriers is associated with a different one of the leaf nodes 104a-104n. In some implementations, the hub transceiver 112 can provide the optical signal to the splitter/combiner, which splits the optical signal into several power-divided instances of the optical signal. Each of the power-divided instances of the optical signal can be transmitted to a respective one of the leaf nodes 104a-104n (e.g., via an optical link 106).

In some implementations, at least some of the ingress network interfaces can include an Ethernet interface, an OTN interface, and/or a Serializer/Deserializer (SerDes) interface. Further, at least some of the egress network interfaces can include a SerDes interface.

Each of the leaf nodes 104a-104n can receive a respective instance of the optical signal, and selectively demodulate that instance of the optical signal according to the set of optical subcarriers to which it is assigned (e.g., to recover the data that is intended for it). Further, each of the leaf nodes 104a-104n can selectively filter, block, or otherwise not demodulate the respective optical signal according to the sets of optical subcarriers to which it is not assigned (e.g., such that it refrains from recovering the data that is not intended for it).

Figure 2:
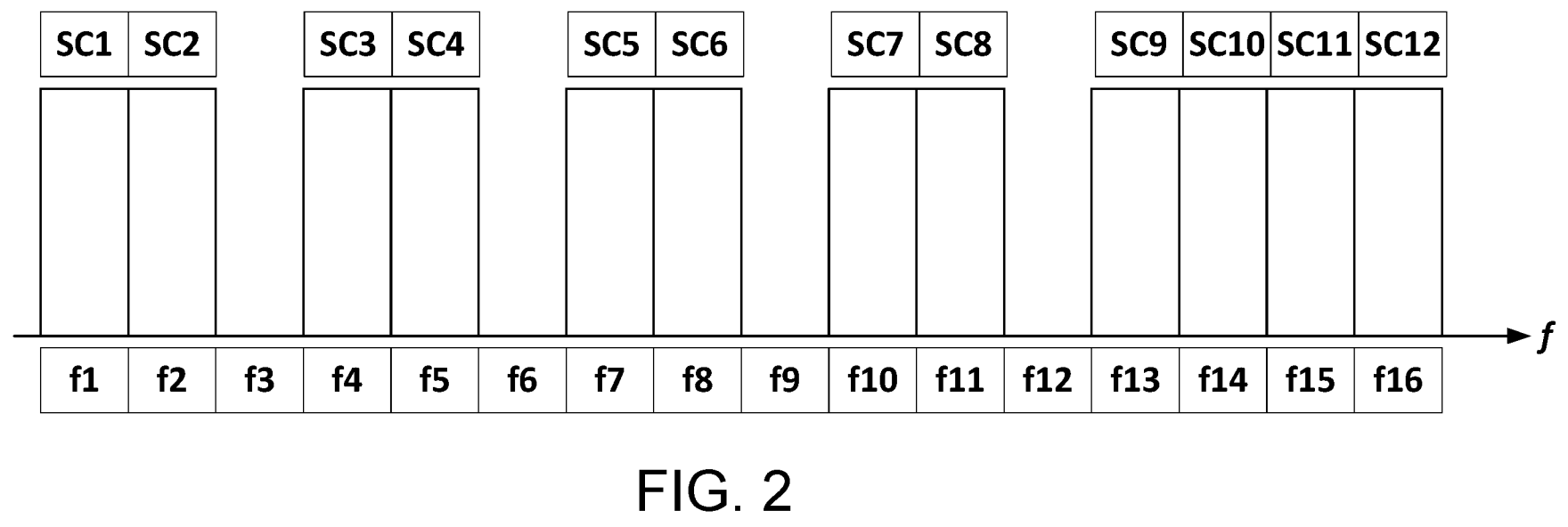

FIG. 2 shows example sets of optical subcarriers SC1-SC16 that may be made available for use by the hub node 102 and the leaf nodes 104a-104n. In this example, the optical subcarriers SC1-SC16 (corresponding to frequencies f1-f16) are available for exchanging data between the hub node 102 and the leaf nodes 104a-104n. Further, each of the optical subcarriers SC1-SC16 are spectrally contiguous with respect to the frequency domain (e.g., the frequencies f1-f16 define a continuous range of frequencies).

In an example configuration, the hub node 102 and the leaf node 104a can be assigned the optical subcarrier SC1 for exchanging data between them. Further, the hub node 102 and the leaf node 104b can be assigned the optical subcarrier SC2 for exchanging data between them. Further still, the hub node 102 and the leaf node 104c can be assigned the optical subcarrier SC3 for exchanging data between them. The other optical subcarriers can be assigned in a similar manner to facilitate the exchange of data between other pairings of the hub node 102 and the leaf nodes.

In some implementations, a single optical subcarrier can be allocated to transmit data between two respective network nodes. In some implementations, multiple optical subcarriers (e.g., two, three, four, or more) can be allocated to transmit data between two respective network nodes.

In some implementations, at least some of the subcarriers described herein can be Nyquist subcarriers. A Nyquist subcarrier is a group of optical signals, each carrying data, where (i) the spectrum of each such optical signal within the group is sufficiently non-overlapping such that the optical signals remain distinguishable from each other in the frequency domain, and (ii) such group of optical signals is generated by modulation of light from a single laser. In general, each subcarrier may have an optical spectral bandwidth that is at least equal to the Nyquist frequency, as determined by the baud rate of such subcarrier.

Although FIG. 2 shows an example configuration of twelve optical subcarriers, FIG. 2 is merely an illustrative example. In general, various number of optical subcarriers can be used by the network nodes 102 and 104a-104n to exchange data. Further, some, none, or all of optical subcarriers can be spectrally contiguous with one another with respect to the frequency domain. Further, some, none, or all of optical subcarriers can be spectrally separated from one another with respect to the frequency domain (e.g., such that one or more guard bands are positioned spectrally between adjacent optical subcarriers in the frequency domain).

In some implementations, the hub node 102 and/or the leaf nodes 104a-104n can include or be connected to plug-gable devices that are configured to enhance the functionality of the network nodes 102 and 104a-104n. For example, at least some of the hub transceiver 112 and/or the leaf transceiver 114a-114n can include a physical communications interface (e.g., a plug or socket) that is configured to reversibly insert into and/or receive corresponding physical communications interface of a network node 102 or 104a-104n, and exchange information with that network node to facilitate network operations and performance.

Figure 3:
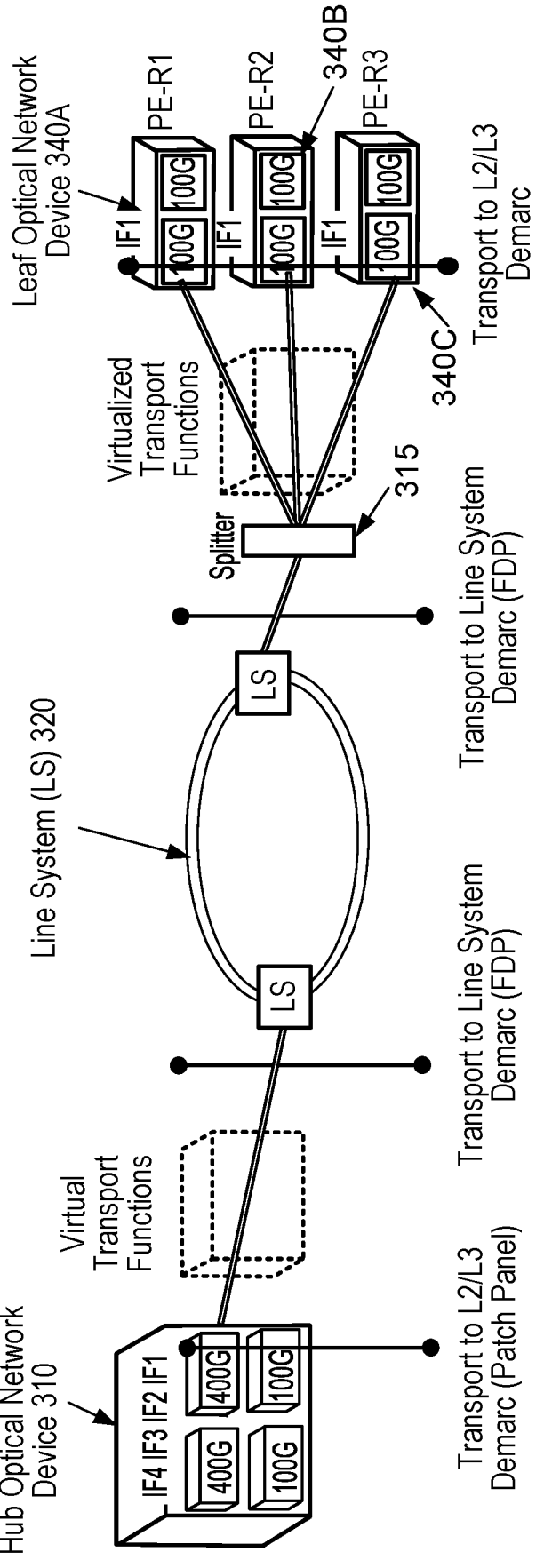
FIG. 3 depicts a diagram of example implementations of communications between a hub node and leaf nodes.

FIG. 3 illustrates an example implementation of an optical network system in which a hub node is connected to one or more leaf nodes through a line system 320. In the system shown in FIG. 3, the hub node is a hub optical network device 310 and the leaf nodes include leaf optical network device 340A, 340B, 340C. Although only three leaf nodes are shown, various numbers of leaf nodes can be part of the optical network system.

The hub optical network device 310 can be one of various suitable electronic devices capable of communicating with an optical network. For example, the hub optical network device 310 (also referred to as host device in some implementations) can be a router or include one or more switches. The hub optical network device 310 can also include one or more interfaces IF1-1F4 and ports. In the example illustrated in FIG. 3, the hub optical network device 310 includes two 100 G interfaces and two 400 G interfaces. Each of these interfaces can be coupled to a port. The interfaces and ports can be coupled to other network nodes (e.g., network servers, routers, switches, user devices) and/or the line system 320 such that data from the hub optical network device 310 or connected devices is transported through one or more interfaces and ports to the line system 320. In some implementations, an XR optical module (e.g., an optical transceiver) can be embedded (not explicitly indicated in FIG. 3) within the hub optical network device 310 to support various network operations and functions, such as virtualized transport functions. In some implementations, such as those shown in FIGS. 4-6, an XR optical module can be plugged into a port of the hub optical network device 310.

The line system 320 can include one or more optical links, such as optical links 106, that can be formed of optical fiber cables to support transmission of data in the form of light signals between multiple network nodes and devices, such as devices 310 and 340A-340C. The line system 320 can transport data over short and long distances and over broad or narrow bands. The data can be encoded by a transmitting device and decoded by a receiving device. In general, various suitable coding techniques can be utilized to implement encoding and decoding of data. The line system 320 can include various components and devices to facilitate the transmission of data across the network. These devices include, for example, optical repeaters such as amplifiers to amplify a modulated optical signal at various locations along an optical communication path in the optical communication network.

In some implementations, optical signals communicated across the line system 320 can include multiple subcarriers (see e.g., FIG. 2) such that a subset of the subcarriers can be allocated to a particular leaf node 340A, 340B, or 340C to communicate data to the leaf node 340A, 340B, or 340C. For example, subcarriers $SC_0$-$SC_3$ can be allocated to leaf node 340A, subcarriers $SC_4$-$SC_7$ can be allocated to leaf node 340B, and subcarriers $SC_0$-$SC_{11}$ can be allocated to leaf node 340C.

In some implementations, the hub optical network device 310 can receive data packets (e.g., from the hub optical network device 310 itself and/or from another network node), ascertain the intended destination of each of the data packets, and identify one or more respective optical subcarriers that can be used to transmit data to each of those destinations. Based on this information, the hub optical network device 310 can generate one or more optical signals (e.g., using one or more light emitters, such as laser emitters), modulate the optical signals according to the identified optical subcarriers (e.g., using one or more local oscillators, multiplexers, etc.), and transmit the modulated optical signals over one or more optical links to each of the intended destinations (e.g., one or more of the leaf nodes 340A-340C).

At the other (destination or leaf node) end of the line system 320, the line system 320 can, in some implementations, be connected to a splitter 315 (e.g., a passive splitter). The splitter 315 can be configured to generate duplicates of all the subcarrier data such that the subcarrier data received from the line system 320 can be provided to each individual destination node, such as leaf nodes 340A-340C.

Each of the leaf nodes 340A, 340B, and 340C can receive optical signals transmitted from the hub optical network device 310 via the line system 320 and, in some cases, the splitter 315. In implementations in which the optical signals are received through the splitter 315, the leaf nodes 340A-340C can include filters for filtering the received optical signals such that each leaf node 340A, 340B, and 340C only receives and processes data for which the leaf node was the desired destination. For example, if leaf node 340A is configured to receive data in subcarriers $SC_0$-$SC_3$, leaf node 340A can include or be connected to a bandpass filter that filters out all frequencies in the received optical signals except for the frequencies for subcarriers $SC_0$-$SC_3$. In this manner, leaf node 340A can receive only data that was intended for it. Leaf nodes 340B and 340C can similarly include or be coupled to filters for controlling the data that is received and processed by them.

Each of the leaf nodes 340A-340C can be one of various suitable electronic devices capable of communicating with an optical network. For example, leaf nodes 340A, 340B, or 340C can be a router or include one or more switches. The leaf nodes 340A, 340B, or 340C can also include one or more interfaces and ports. In the example illustrated in FIG. 3, each of the leaf nodes 340A, 340B, or 340C include two 1000 interfaces. Each of these interfaces can be coupled to a port. The interfaces and ports can be coupled to the line system 320 such that data from the line system 320 is provided through one or more interfaces and ports to a leaf node 340A, 340B, or 340C.

Some optical systems may also include a transport device (not shown in FIG. 3), for example, between a hub optical network device and a line system and between a line system and the leaf nodes. Such transport devices may perform layer 1 (physical layer) operations whereas the layer 2 and 3 (data link and network layers) operations would be performed by the hub optical network device and leaf nodes. The transport device between the hub optical network device and the line system may include a multiplexor and other electronic circuitry that would receive data from the hub optical network device and multiplex and code the data to convey the data in the line system using Dense Wavelength-Division Multiplexing (DWDM). The transport device between the line system and the leaf nodes may receive signals from the line system and demultiplex and decode the signals to direct signals to the intended destination leaf node.

However, incorporating the transport devices into the optical system would require additional hardware, space, and power to accommodate the additional hardware. In contrast, the optical system depicted in FIG. 3 does not include the transport device. Transport functions performed by the transport device can be virtualized and performed by a XR optical module controller coupled to a XR optical module, as described in more detail below. In FIG. 3, virtualized transport functions are shown where transport devices would traditionally be implemented. However, in the implementations described in this disclosure, the virtualized transport functions can be performed by the XR optical module controller that control the XR optical module plugged into or embedded within the hub optical network device 310. Additional details of the optical modules and controllers are described with respect to FIGS. 4-6.

Figure 4:
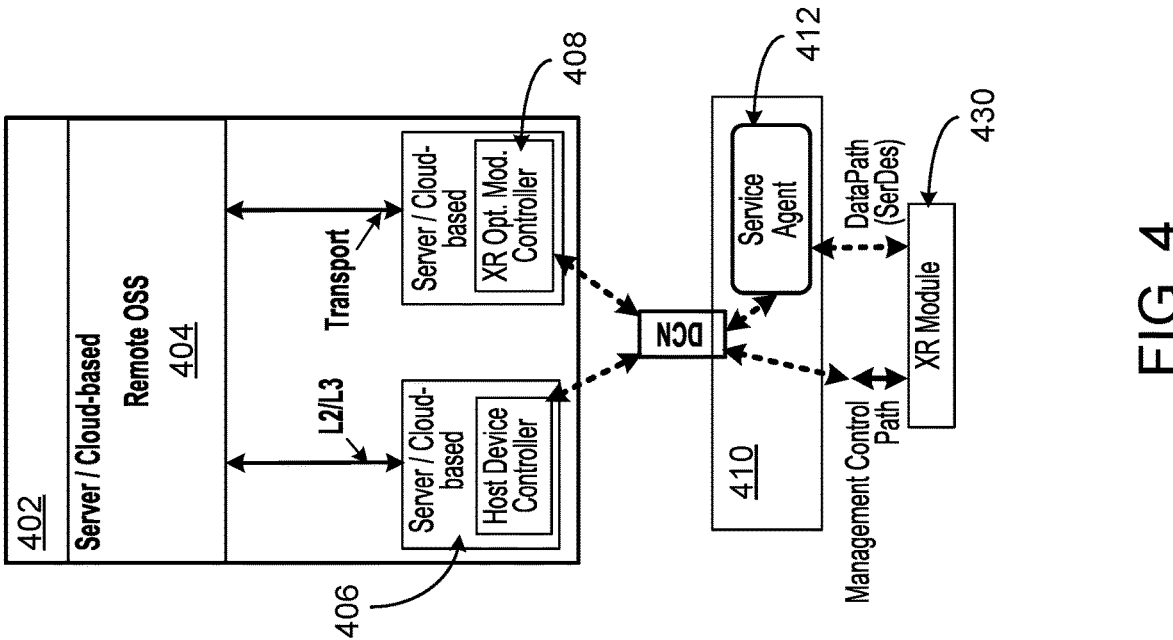
FIG. 4 depicts a diagram of example implementations of communications between a server, optical network device, and optical module.

FIG. 4 illustrates a block diagram of an optical network device (OND) 410 in communication with an XR optical module 430 and a server 402. The optical network device 410, which can also be referred to as a host device, may be any one of various network devices, such as a hub optical network device 310 or leaf node 340A, 340B, or 340C. The optical network device 410 can include a service agent 412. The XR optical module 430 can be implemented in various suitable manner. For instance, in some implementations, the XR optical module 430 is a pluggable optical hardware device that includes a memory and one or more processors for executing operations such as communicating with the agent 412 or other electronic components within the optical network device 410 or sever 402. In some implementations, the XR optical module 430 is circuitry that is embedded within the circuitry of the optical network device 410.

The XR optical module 430 can include one or more registers and can advertise its capabilities to the optical network device 410. For example, upon being plugged into the optical network device 410 or being powered on when embedded within the optical network device 410, the XR optical module 430 can send data to the optical network device 410 indicating its properties and capabilities such as the number and type of interfaces it has, e.g., four 100 G Ethernet Media Access Control (MAC) interfaces, one 400 G Ethernet MAC interface. The XR optical module 430 can also send data such as frequency, bandwidth, bit rate, or various other suitable setting information. The XR optical module 430 can be reached externally via variants of data communication network (DCN) ports, inband control channels, or via data paths with the optical network device 410.

The optical network device 410 can receive the capabilities information for one or more interfaces of the XR optical module 430 and forward the information to an host device controller 406 in the server 402. The host device controller 406 can control the selection of the configuration and settings of the optical network device 410 and its interface with the XR optical module 430. For example, the host device controller 406 can select one or more of the interfaces, e.g., 4×100 G, Management Data Input/Output (MDIO), and can determine the services, agreements, and settings that are to be used with the selected interface of the XR optical module 430. Examples of the services, agreements, and settings include Content Management Interoperability Services (CMIS), C form-factor pluggable settings, Multi-source Agreements (MSAs), and power-up instructions. The agreements can include register-based definitions, commands and agreements as to the electrical and management interface specification to be used. The selected interface and setting information can be transmitted back to the optical network device 410 and XR optical module 430, which can then be configured to support communications between the server 402, the optical network device 410, and the XR optical module 430 based on the received interface and setting information.

The optical network device 410 can include a management engine configured to manage communications with the host device controller 406 and a XR module controller 408 in the server. The management engine can include a service agent 412 embedded within the optical network device 410. The service agent 412 can perform several operations such as discovery of the XR optical module 430 and network address/port translation (NAPT) and assignment. The service agent 412 can be connected to the XR optical module 430 through a Serializer/Deserializer (SerDes) interface to facilitate data transmission between the server 402 and the XR optical module 430. In some implementations, the service agent 412 can be an application or executable file that is installed within the optical network device 410 and allows third party applications to be installed. Additional details of the optical network device 410 are described with respect to FIG. 5 below.

The XR module controller 408 can be used to remotely manage the XR module 430 and optimize the optical performance of the XR optical module 430. In this manner, the XR optical module 430 does not have to be controlled at the optical network device 410 and a user or system operator does not have to be physically present at the location of the optical network device 410 to control the settings of the XR optical module 430. The XR module controller 408, which can be cloud based, can communicate with the XR optical module 430 through the service agent 412 to perform virtualized transport functions, which in other systems are generally performed by transport devices. The virtualized transport functions can include various functions such as bandwidth management and network topology management. The XR module controller 408 can perform various other operations including, but not limited to, evaluating and optimizing optical network performance, implementing capacity reconfiguration without truck roll, and permitting remote XR optical module management.

The XR module controller 408 and the host device controller 406 can be implemented as part of server 402, which can be connected to the optical network device 410 through a wired and/or wireless connection, such as an Internet connection. In some implementations, the server 402 can be cloud-based such that the XR module controller 408 and the host device controller 406 are cloud-based controllers that permit a user to remotely control the optical network device 410 and the XR optical module 430.

The server 402 can include various computer circuitry such as processors, memories, programmable modules, and may be connected to display systems, and user interfaces, such as a keyboard, mouse, touch screen, and a microphone.

In addition to the host device controller 406 and the XR optical module controller 408, the server 402 can also include a back office operational support system (OSS) 404.

The OSS 404 can support the design, build, and running of the optical communications network and services utilized by the optical network. The OSS 404 can include one or more network management processes so that communications in the optical network can be conducted efficiently with minimal interruptions or congestion.

In some implementations, the OSS 404 and host device controller 406 can perform layer 2 and 3 operations such that the layer 2/3 demarc is implemented within the server 402 (in contrast to other systems in which the layer 2/3 demarc may be beyond the server 402). The OSS 404 and XR module controller 408 can perform the virtualized transport functions. The OSS 404 may provide data or instructions received from one or more user devices to the host device controller 406 and XR optical module controller 408 to control the optical network device 410 and the XR optical module 430 and transmit data across an optical network to other network nodes, as described above with respect to FIGS. 2 and 3.

Figure 5:
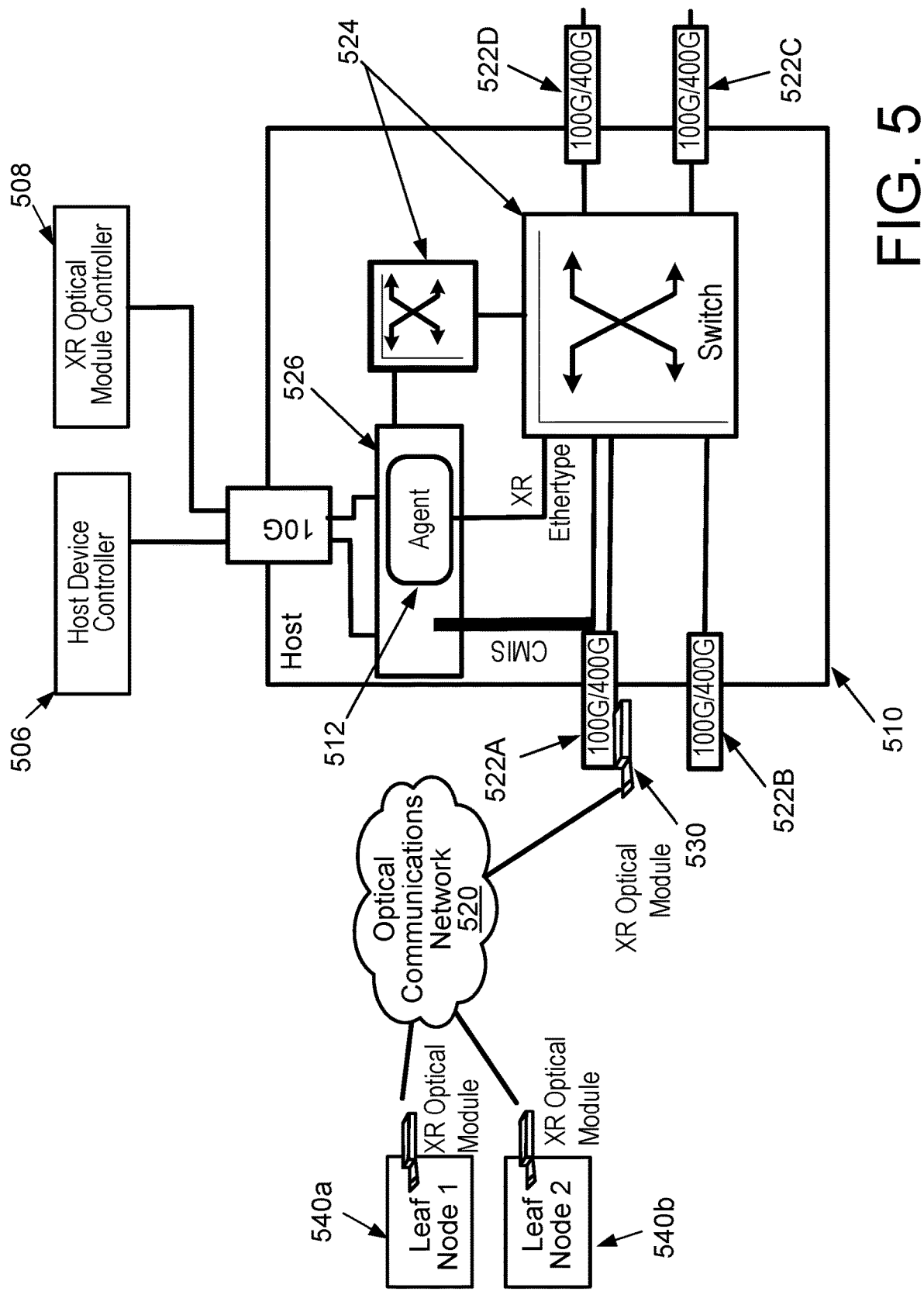
FIG. 5 depicts a diagram of example implementations of communications between a server, optical network device, optical module, and leaf nodes.

FIG. 5 illustrates a block diagram of an optical network that includes an optical network device 510 (may also be referred to as host device) communicating with leaf nodes 540a, 540b. In some implementations, leaf nodes 540a, 540b correspond to the leaf nodes 104a, 104b described above with respect to FIG. 1 or leaf nodes 340A, 340B described above with respect to FIG. 3. In some implementations, the optical network device 510 corresponds to the optical network device 410 described with respect to FIG. 4. The optical network device 510 is connected or coupled to a host device controller 506 corresponding to host device controller 406 and a XR optical module controller 508 corresponding to XR optical module controller 408.

The optical network device 510 has several ports and interfaces. For example, the optical network device 510 includes four 100 G/400 G interfaces 522A-522D that are connected to one or more switches 524 in the optical network device 510. XR optical module 530 is plugged into a port coupled to interface 522A. The optical network device 510 can communicate with leaf nodes 540a, 540b through the XR optical module 530 and the optical communication network 520, which may include a line system such as line system 320. Each of the leaf nodes 540a, 540b also have a XR optical module plugged into the node.

Similar to FIG. 4, the optical network device 510 includes switches 524 and management engine 526 that further includes a service agent 512 corresponding to service agent 412 in FIG. 4. The switches 524 can direct data from the ports and interfaces to other components within the optical network device, such as the management engine 526, or components connected to the optical network device, such as XR optical module 530 and controllers 506 and 508. The switches 524 can, in conjunction with the service agent 512, perform packet parsing such that packets can be filtered and terminated based on address and packet types, e.g., MVLAN, MAC address, ethertype.

The management engine 526 can be implemented by one or more processors and can communicate with the host device controller 506, the XR optical module controller 508, and the XR optical module 530 to manage the communication settings between the XR optical module controller 508 and controllers 506 and 508. CMIS commands can be used by the management engine 526 to communicate with the XR optical module 530. The management engine 526 can receive and process communications from one or more external networks, e.g., DCN, virtual local area network (VLAN), or multicast VLAN (MVLAN), through one or more of its interfaces 522B-522D. The management engine 526 can receive and process communications from the various external networks with requiring a separate network manager, e.g., a separate VLAN manager, dedicated to a particular network type.

In some implementations, the service agent 512 can be implemented as or include a combination of software and hardware, such as a processor connected to a memory device, to implement the operations of the service agent 512 described herein. The service agent 512 can operate as a facilitator or translator of the communications to and from the optical network device 510 or within it (e.g., between switches 524 and the XR optical module controller 508) and can perform discovery and address assignment operations and establish IP connections (e.g., between the XR optical module 530 and a server (e.g., optical controller 508)). For example, when a XR optical module, such as module 530, is plugged into the optical network device 510, the service agent 512 can identify the port that the XR optical module 530 was plugged into and a communication network type (e.g., MVLAN) to associate with the XR optical module 530. The communication network type can be discovered by sending and receiving L2 discover messages.

The service agent 512 can also perform IP address configuration and allocation (e.g., IPv4/IPv6 addresses) using any suitable technique, such as Dynamic Host Configuration Protocol (DHCP). In some implementations, the XR optical module 530 can only be assigned IPv6 addresses, and the ports can have Transport Communication Protocol (TCP) or User Datagram Protocol (UDP) port numbers. The TCP/UDP port numbers can be associated with the IP address assigned to each XR optical module and can be stored in a Network Address Port Translation (NAPT) Table, which can be used when performing any IPv4-Ipv6 and port translations. In some implementations, when global IPv6 addresses are used, no address translation is needed. More generally, the service agent 512 can perform various operations to enable an Internet Protocol (IP) interface between the XR optical module 530 and an XR module controller 408 in the server 402.

The service agent 512 can also perform the following operations and functions: executing callbacks to integrating to the optical network device for sending and receiving link level frames to and from the XR optical module 530 (chipset adaptation), and communicating with the XR optical module 530 using Organizationally unique identifier (OUI) Extended EtherType frames.

The service agent 512 can include a core module, a support library, and an adaptation module. The core module can support message translation and routing (e.g., NATP, TCP/IP and port translation and routing). The support library can facilitate with discovery processes and provide an IP address of a newly connected module and of the XR optical module controller 508. The service agent 512 can configure the IP address of the XR optical module controller 508 one time only so that whenever a new connection by an XR optical module is detected, the service agent 512 can provide the IP address of the XR optical module controller 508 to the newly connected XR optical module, and vice versa. The service agent 512 can then send packets to the newly connected XR optical module and provide the IP address of the XR optical module controller 508 to enable communications between the XR optical module and the XR optical module controller 508.

The adaptation module can provide access to resources on the optical network device 510, such as a memory, clock, or processor in the optical network device 510. The adaptation module can also provide callback function information for modules to communicate with the XR optical module controller 508.

Figure 6:
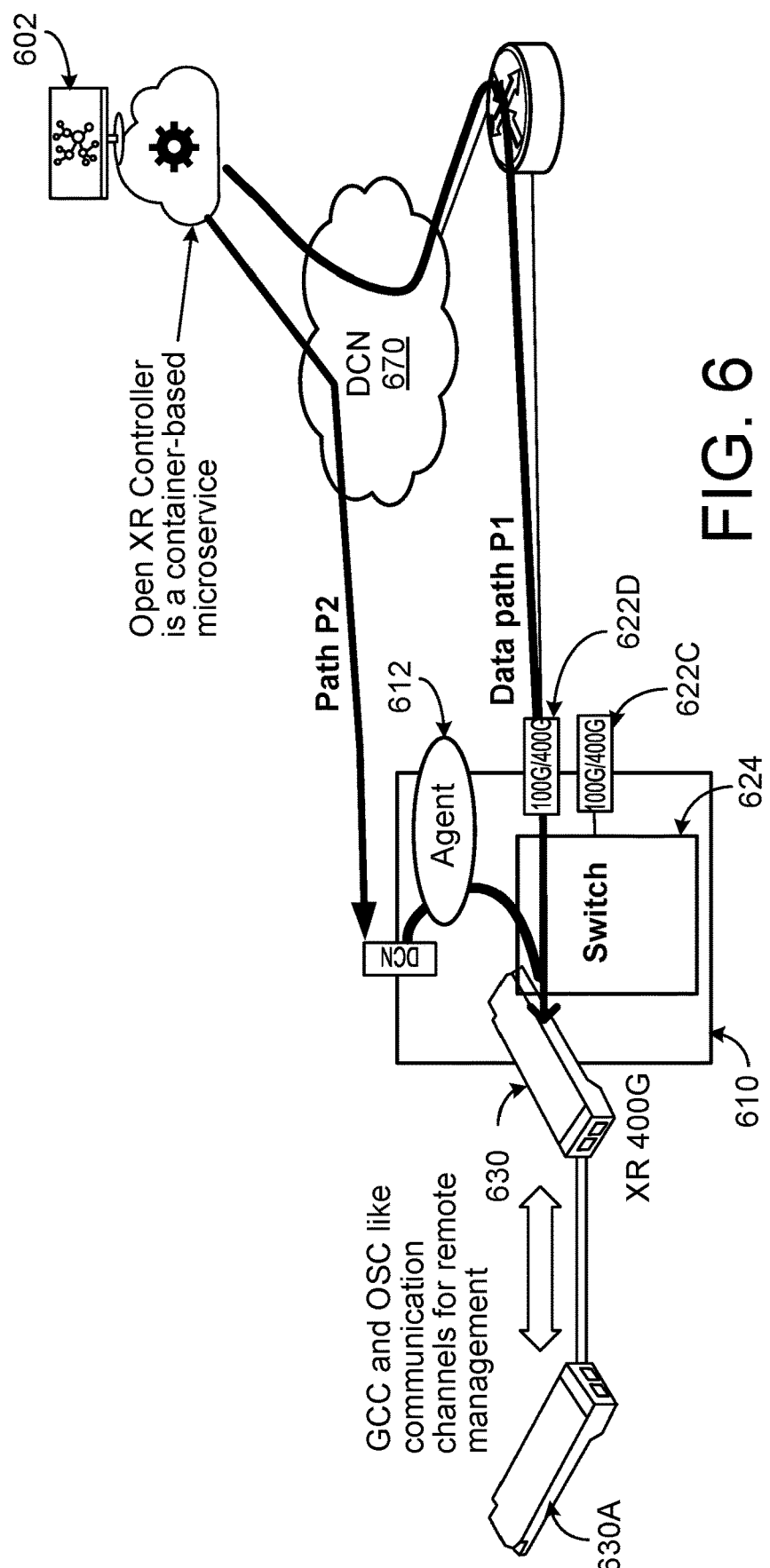
FIG. 6 depicts a diagram of example implementations of communications between a server, optical network device, and optical module.

FIG. 6 illustrates another example of implementing communications using an XR optical module and an XR optical module controller. In FIG. 6, a server 602 is in communication with XR optical module 630 through an optical network device 610. In some implementations, the server 602 corresponds to server 402, optical network device 610 corresponds to optical network device 410 or 510, interfaces 622C, 622D correspond to interfaces 522C, 522D, agent 612 corresponds to agent 412 or 512, switch 624 corresponds to switch 524, and XR optical module 630 corresponds to XR optical module 430 or 530. The server 602 includes an host device controller such as controller 406 or 506 and a XR optical module controller such as controller 408 or 508. The server 602 is connected to the optical network device 610 through two routers and one or more DCNs 670.

A user can be located remotely (to the RX optical module 630) and can use a computer connected to or part of server 602. The user can open a user interface, such as a graphical user interface, on the computer to generate commands and send data through the XR optical module controller and host device controller. The user can perform remote management through embedded communication channels.

For instance, as shown in FIG. 6, two communication channels can be used for communications between the server 602 and the XR optical module 630. One channel can include data path P1. A second channel can traverse a different path P2 which can be used for exchanging information used to configure settings and other management related information (e.g., Management Data Input/Output (MDIO), services, agreements, CMIS commands). Both paths P1 and P2 can traverse through the service agent 612, if needed, and data from the paths P1 and P2 can be routed to and from the Rx optical module by router/switch 624. As such, different paths can be used for communicating data to and from the XR optical module and for communicating configuration and management settings.

Leaf nodes in communication with the optical network device 610 are not shown in FIG. 6, but may have their own Rx optical modules. In FIG. 6, Rx optical module 630A is an example of an Rx optical module that is plugged into a leaf node and is communicating with Rx optical module 630 connected to the optical network device 610. By virtue of using the host device controller and a XR optical module controller in server 602 to configure communication settings and transmit/receive data, coordinated operations can be conducted directly between modules 630 and 630A using both in-band and out-of-band control channels over optical fiber links. In this manner, general communication channel (GCC) and optical service channel (OSC) like communication channels can be realized for remote management.

Hereinafter, an example of performing communications using an XR optical module is described. Initially, a user can configure an optical network device, such as optical network device 310, 410, 510, or 610, by designating one or more of the ports of the optical network device for external network (e.g., MVLAN) communications. In some implementations, a user, such as a system administrator, can implement this configuration by sending instructions to the optical network device remotely through a server, such as server 402. In some implementations, the user can configure the optical network device locally.

When an XR optical module is connected to the optical network device, the service agent in the optical network device can conduct discovery operations by sending and receiving discovery messages to identify the port and interface through which the XR optical module is connected. The service agent can also allocate an IP address to the XR optical module and provide the XR optical module with the IP addresses of the host device controller and the XR optical module controller, and vice versa, so that the XR optical module and both controllers can communicate with each other.

As an example, in response to the XR optical module being powered on or plugged into the optical network device, the XR optical module controller can send, via the service agent, a multicast discovery message (e.g., multicast Hello message) to the XR optical module that includes a MAC address of the XR optical module controller and ethertype information (e.g., OUI extended ethertype). The XR optical module can respond with a unicast discovery acknowledgment message (e.g., multicast Hello Ack message) that includes a MAC address, an identification of the network to communicate with, and ethertype information. After discovery, a dynamic IP address allocation can be performed to assign an IP address to the XR optical module.

Next, the XR optical module can register itself with the XR optical module controller. In some implementations, the XR optical module controller can perform one or more authentication protocols to authenticate the XR optical module. In some implementations, the XR optical module controller can also execute one or more security protocols to ensure that communications with the XR optical module are secure. For example, optical module controller can query the XR optical module to provide customer credentials or other security credentials and certificates. Once the registration, authentication, and security protocols have been completed and satisfied, the XR optical module can be used to facilitate communications between a user and the leaf nodes through the optical network device and/or another network, such as a MVLAN network.

While this specification contains many specifics, these should not be construed as limitations on the scope of the disclosure or of what may be claimed, but rather as descriptions of features specific to particular implementations. Certain features that are described in this specification in the context of separate implementations may also be combined. Conversely, various features that are described in the context of a single implementation may also be implemented in multiple implementations separately or in any suitable subcombination. Moreover, although features may be described above as acting in certain combinations and may even be claimed as such, one or more features from a claimed combination may, in some cases, be excised from the combination, and the claimed combination may be directed to a sub-combination or variation of a sub-combination. For example, although the mapping operation is described as a series of discrete operations, the various operations may be divided into additional operations, combined into fewer operations, varied in order of execution, or eliminated, depending on the desired implementation. Similarly, the separation of various system components in the implementations described above should not be understood as requiring such separation in all implementations.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, some or all of the components described herein can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium also can be, or can be included in, one or more separate physical components or media (e.g., disk drives or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows also can be performed by, and apparatus also can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

A computer system may include a single computing device, or multiple computers that operate in proximity or remote from each other and typically interact through a communication network. Examples of communication networks include a local area network ("LAN") and a wide area network ("WAN"), an inter-network (e.g., the Internet), and peer-to-peer networks (e.g., ad hoc peer-to-peer networks). A relationship of client and server may arise by virtue of computer programs running on the respective computers and having a client-server relationship to each other.

Terms used herein and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together. The term "and/or" is also intended to be construed in this manner.

The use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

Various modifications can be made to the foregoing examples. Accordingly, other implementations also are within the scope of the claims.

What is claimed is:

1. A system comprising:
an optical transceiver coupled to an optical network device and configured to connect the optical network device to an optical network that comprises two or more network nodes; and
the optical network device comprising:
a service agent configured to communicate with the optical transceiver, and
a server to configure the optical transceiver for remote management through the server, the remote management being performed at a location different from a location of the optical transceiver and different from a location of the optical network device,
wherein the server is configured to communicate with the optical transceiver through the optical network device to perform virtualized transport functions; and
wherein the service agent is configured to:
discover a connection of the optical transceiver with the optical network device through a pluggable interface; and
establish an Internet Protocol connection between the optical transceiver and an optical transceiver controller of the server.

2. The system of claim 1, wherein:
the optical network comprises a multicast virtualized local access network or a data communication network;
the optical network device comprises a router or switch; and
the server comprises a cloud-based server.

3. The system of claim 1, wherein:
the optical network device is a hub node connected to one or more leaf nodes in the optical network;
the one or more leaf nodes are connected to a splitter that is connected to a line system of the optical network; and
the splitter is configured to receive data from the optical network device through the line system and direct the received data to each of the one or more leaf nodes.

4. The system of claim 1, wherein the server comprises:
an optical transceiver controller configured to communicate with the service agent to perform the virtualized transport functions; and an host device controller configured to control selection of one or more of a setting, agreement, or service to be used for communications with the optical transceiver.

5. The system of claim 4, wherein the virtualized transport function comprise one or more of bandwidth management, network topology management, or optimizing performance of the optical network.

6. The system of claim 4, wherein the host device controller is configured to perform layer 2 and layer 3 operations such that a layer 2/3 demarc is implemented within the server.

7. The system of claim 1, wherein a Serializer/Deserializer (SerDes) interface coupling the optical network device and the optical transceiver is configured to provide a data path for communicating data between the server and the optical transceiver.

8. The system of claim 1, comprising:
a first communication channel configured to provide a data path for exchanging data between the optical transceiver and the server, and
a second communication channel configured to provide a second path for communication management and settings information between the optical transceiver and the server,
wherein the first communication channel and the second communication channel traverse the service agent.

9. The optical network device of claim 1, wherein:
the optical network comprises a router or a switch;
the server comprises a cloud-based server; and
the optical transceiver is a pluggable optical transceiver.

10. The optical network device of claim 1, further comprising an optical network interfaces, wherein the optical network interface is coupled to or comprises a Serializer/Deserializer (SerDes) interface connected to the optical transceiver to provide a data path for communication data between the server and the optical transceiver.

11. An optical network device comprising:
a first port configured to receive and connect to an optical transceiver;
a second port configured to connect to a server configured to remotely manage the optical transceiver through the optical network device; and
a management engine comprising a service agent configured to communication with the server the optical transceiver to configure an IP interface between the server and optical transceiver and enable performance of virtualized transportation function;
wherein the service agent is configured to:
discover a connection of the optical transceiver with the optical network device through the first port that comprises a pluggable interface; and
establish an Internet Protocol connection between the optical transceiver and an optical transceiver controller of the server.

12. The optical network device of claim 11, wherein the virtualized transport functions comprise one of more of bandwidth management, network topology management, or optimizing performance of the optical network.

13. The optical network device of claim 11, wherein the service agent is configured to:
receive, from the server, data indicative of a selection of one or more of a setting, agreement, or service to be used for communications between the server and the optical transceiver;

transmit, to the optical transceiver, one or more portions of the data indicative of the selection of the one or more of the setting, agreement or service; and
configure communications between the server and the optical transceiver based on the selection of one or more of the setting, agreement, or service.

14. The optical network of claim 11, wherein the service agent is configured to:
transmit a multi case discovery message comprising ethertype information and a media access control address of an optical transceiver controller to the optical transceiver;
receive, from the optical transceiver, a unicast discovery acknowledgement message that comprises a media access control address of the optical transceiver and an identification of a network type connected to the optical transceiver; and
configure the IP interface based on the media access control address of the optical transceiver and the media access control address of the optical transceiver.

15. An optical network device comprising:
a service agent processor configured to enable performance of virtualized transportation functions and to establish an Internet Protocol connection between an optical transceiver and a server that is configured to remotely manage the optical transceiver,
a first communication channel configured to provide a data path of exchanging data between the optical transceiver and an optical transceiver controller of the server; and
a second communication channel configured to provide a second path for communicating management and settings information between the optical transceiver and the optical transceiver controller of the server;
wherein the virtualized transport functions comprise one or more of bandwidth management, network topology management, or optimizing performance of an optical network connected to the optical network device.

16. The optical network of claim 15, wherein:
the optical network comprises a multicast virtualized local access network or a data communication network;
the optical network device comprises a router or a switch; and
the server comprises a cloud-based server.

17. The optical network device of claim 15, comprising:
a first port configured to connect to the optical transceiver through a pluggable interface;
a second port configured to connect to the server comprising an optical transceiver controller; and
the service agent processor is configured to:
discover a connection of the optical transceiver with the optical network device through the first port;
a second port configured to connect to a server comprising an optical transceiver controller; and
wherein the service agent processor is configured to:
discover a connection of the optical transceiver with the optical network device through the first port;
execute callbacks to integrating to the optical network device for sending and receiving link level frames to and from the optical transceiver; and
communication with the optical transceiver using organizationally unique identifier (OUI) extended EtherType frames.

* * * * *